(12) United States Patent
Kim et al.

(10) Patent No.: US 10,651,696 B2
(45) Date of Patent: May 12, 2020

(54) MOTOR ROTOR

(71) Applicant: Samsung Electronics Co., Ltd., Suwon-si, Gyeonggi-do (KR)

(72) Inventors: Won-ho Kim, Hwaseong-si (KR); Sung-hyuk Park, Seoul (KR); Seong-taek Lim, Suwon-si (KR); Woong Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 492 days.

(21) Appl. No.: 15/341,384

(22) Filed: Nov. 2, 2016

(65) Prior Publication Data

US 2017/0126081 A1   May 4, 2017

(30) Foreign Application Priority Data

Nov. 3, 2015   (KR) .................. 10-2015-0153856

(51) Int. Cl.
   *H02K 1/27*   (2006.01)
   *H02K 1/28*   (2006.01)
   (Continued)

(52) U.S. Cl.
   CPC ......... *H02K 1/2706* (2013.01); *H02K 1/2773* (2013.01); *H02K 1/30* (2013.01);
   (Continued)

(58) Field of Classification Search
   CPC .......... H02K 1/2773; H02K 1/28; H02K 1/30; H02K 1/2706; H02K 15/03; H02K 2213/03; H02K 2213/12
   (Continued)

(56) References Cited

U.S. PATENT DOCUMENTS 4,543,506 A  *  9/1985  Kawada ............... H02K 1/2773
                                                        310/156.22
9,712,007 B2    7/2017  Tanaka
(Continued)

FOREIGN PATENT DOCUMENTS

CN   104054237 A   9/2014
CN   104769825 A   7/2015
(Continued)

OTHER PUBLICATIONS

European Examination Report dated Jul. 26, 2019, issued in European Application No. 16862447.6.
(Continued)

*Primary Examiner* — Thomas Truong
(74) *Attorney, Agent, or Firm* — Jefferson IP Law, LLP

(57) ABSTRACT

A motor is provided. The motor includes a stator, a rotor rotatably disposed in the stator, and a motor shaft provided in the rotor to rotate integrally with the rotor. The rotor includes at least one permanent magnet fixing core, at least one injection fixing core alternately stacked with the at least one permanent magnet core in a direction of the motor shaft, a plurality of permanent magnets inserted at a predetermined interval in the at least one permanent magnet fixing core and the at least one injection fixing core, and an injection ring formed to cover the at least one permanent magnet fixing core, the at least one injection fixing core, and the plurality of permanent magnets. The at least one permanent magnet fixing core is formed to prevent the permanent magnets from becoming separated from the rotor by a centrifugal force, and the at least one injection fixing core is formed to prevent the injection ring from becoming separated from the rotor by the centrifugal force.

20 Claims, 35 Drawing Sheets

(51) Int. Cl.
*H02K 1/30* (2006.01)
*H02K 15/03* (2006.01)

(52) U.S. Cl.
CPC ......... *H02K 15/03* (2013.01); *H02K 2213/03* (2013.01); *H02K 2213/12* (2013.01)

(58) Field of Classification Search
USPC ............ 310/156.08, 156.12, 156.23, 156.28, 310/156.31, 156.56
See application file for complete search history.

(56) References Cited

U.S. PATENT DOCUMENTS

| | | | |
|---|---|---|---|
| 2009/0001839 A1 | 1/2009 | Masayuki et al. | |
| 2012/0326548 A1 | 12/2012 | Nonaka | |
| 2013/0187486 A1* | 7/2013 | Lee | H02K 5/02 310/43 |
| 2014/0042854 A1 | 2/2014 | Asahi et al. | |
| 2015/0022042 A1 | 1/2015 | Han et al. | |
| 2015/0180292 A1 | 6/2015 | Tanaka | |
| 2015/0244218 A1* | 8/2015 | Kaufmann | H02K 1/2773 310/156.58 |
| 2015/0303751 A1 | 10/2015 | Ekin et al. | |
| 2017/0271932 A1 | 9/2017 | Tanaka | |

FOREIGN PATENT DOCUMENTS

| | | |
|---|---|---|
| DE | 10 2010 062981 A1 | 6/2012 |
| DE | 10 2013 009 115 A1 | 3/2014 |
| EP | 2 618 462 A2 | 7/2013 |
| EP | 2 816 709 A1 | 12/2014 |
| JP | 2013-102597 A | 5/2013 |
| JP | 2014-36456 A | 2/2014 |
| JP | 2015-33245 A | 2/2015 |
| KR | 10-1244574 B1 | 3/2013 |
| KR | 10-2015-0009891 A | 1/2015 |
| KR | 10-2015-0072450 A | 6/2015 |
| KR | 20-2015-0003587 U | 10/2015 |
| WO | 2013/168295 A1 | 11/2013 |
| WO | 2014/082840 A2 | 6/2014 |
| WO | 2014/129086 A1 | 8/2014 |

OTHER PUBLICATIONS

Chinese Office Action dated Jun. 24, 2019, issued in Chinese Application No. 201680065634.2.
Chinese Office Action dated Feb. 21, 2020, issued in Chinese Application No. 201680065634.2.

* cited by examiner

MOTOR ROTOR

CROSS-REFERENCE TO RELATED APPLICATION(S)

This application claims the benefit under 35 U.S.C. § 119(a) of a Korean patent application filed on Nov. 3, 2015 in the Korean Intellectual Property Office and assigned Serial number 10-2015-0153856, the entire disclosure of which is hereby incorporated by reference.

TECHNICAL FIELD

The present disclosure relates to a motor. More particularly, the present disclosure relates to a motor including an improved rotor structure.

BACKGROUND

A motor is a device that is used to covert electrical energy to mechanical energy, and typically includes a stator and a rotor. The rotor is configured to rotate by a force that is generated electromagnetically between the stator and the rotor.

Since a spoke-type permanent magnet motor using permanent magnets to generate a magnetic field has structurally high magnetic flux concentration, the spoke-type permanent magnet motor can generate high torque and high power, and is thereby capable of reducing the size of the motor while producing the same or greater output power. Accordingly, the spoke-type permanent magnet motor may be used as a drive motor for washing machines, air conditioners, vacuum cleaners, and the like, that require such high torque and high output characteristics.

FIGS. 1 and 2A are views illustrating an example of a spoke-type permanent magnet motor according to the related art.

Referring to FIGS. 1 and 2A, a spoke-type permanent magnet motor 1 includes a stator 20, a rotor 30, and a motor shaft 40.

The rotor 30 disposed inside the stator 20, is rotated with respect to the stator 20, and is integrally provided with the motor shaft 40 in the center of the rotor 30.

The rotor 30 also includes a plurality of permanent magnets 31 arranged in a radial shape relative to the motor shaft 40, a core 32 that supports the plurality of permanent magnets 31 and forms a passage of magnetic flux, and an injection ring 33 to cover the permanent magnets 31 and the core 32.

However, the spoke-type permanent magnet motor 1 may have a problem in that the permanent magnets 31 become separated from the core 32 or that parts of the injection ring 33 covering the permanent magnets 31 become separated from the core 31, become deformed, or are broken by a centrifugal force generated while the rotor 30 rotates at a high speed.

In order to prevent the problem, the motor 1 of the related art includes a structure that is capable of preventing the permanent magnets 31 and the injection ring 33 from becoming separated from the core 32 as illustrated in FIG. 2B.

FIG. 2B is an enlarged partial view illustrating a portion of a rotor of a spoke-type permanent magnet motor according to the related art.

Referring to FIG. 2B, a fixing protrusion 35 for supporting the permanent magnet 31 and a fixing groove 36 for holding the injection ring 33 are provided at an outer end of a magnet fixing hole 34 of the core 32. The fixing protrusion 35 can prevent the permanent magnets 31 from being extracted from the magnet fixing hole 34 by the centrifugal force generated when the rotor 30 rotates. Also, because a portion of the injection ring 33 is inserted into the fixing groove 36, the injection ring 33 may be prevented from becoming separated from the core 32 by the centrifugal force when the rotor 30 rotates.

However, since the structure of the motor 1 of the related art for preventing separation of the permanent magnets 31 and injection ring 33 is formed so that the fixing protrusion 35 for fixing the permanent magnet 31 and the fixing groove 36 for holding the injecting ring 33 are overlappingly formed in the radial direction of the rotor 30 at the outer end of the magnet fixing hole 34 receiving the permanent magnet 31, the size of the separation preventing structure of the permanent magnet 31 and the injection ring 33 is large. In particular, a distance g1 between the outer end of the permanent magnet 31 and the outer circumferential surface of the rotor 30 is large. Accordingly, when the radius R of the rotor 30 is maintained at a standard size, there is a resulting problem where the size of the permanent magnet 31 must be reduced. When the size of the permanent magnet 31 is reduced, there is a resulting problem where the maximum output torque of the motor 1 is also reduced.

The above information is presented as background information only, to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages, and to provide at least the advantages described below. Accordingly, an aspect of the present disclosure is to provide a motor that can prevent separation of the permanent magnets and an injection ring and that can enhance a maximum output torque.

In accordance with an aspect of the present disclosure, a motor is provided. The motor includes a stator, a rotor rotatably disposed in the stator, and a motor shaft provided in the rotor to rotate integrally with the rotor, wherein the rotor may include at least one permanent magnet fixing core, at least one injection fixing core alternately stacked with the at least one permanent magnet core in a direction of the motor shaft, a plurality of permanent magnets inserted at a predetermined interval in the at least one permanent magnet fixing core and the at least one injection fixing core, and an injection ring formed to cover the at least one permanent magnet fixing core, the at least one injection fixing core, and the plurality of permanent magnets, wherein the at least one permanent magnet fixing core may be configured to prevent the permanent magnets from becoming separated from the rotor by a centrifugal force, and wherein the at least one injection fixing core may be configured to prevent the injection ring from becoming separated from the rotor by the centrifugal force.

In accordance with another aspect of the present disclosure, a motor is provided. The motor includes a stator, a rotor rotatably disposed in the stator, and a motor shaft provided in the rotor to rotate integrally with the rotor, wherein the rotor may include a plurality of mixed fixing cores stacked alternately in a direction of the motor shaft, a plurality of permanent magnets inserted at a predetermined interval in the plurality of mixed fixing cores, and an injection ring formed to cover the plurality of mixed fixing core and the plurality of permanent magnets, wherein each of the plurality of mixed fixing cores may be provided with a plurality of magnet fixing holes configured to receive the plurality of permanent magnets in a circumferential direction, and wherein each of the plurality of magnet fixing holes may be provided with a fixing protrusion formed at one side of an outer end in a radial direction configured to secure the permanent magnet and prevent the plurality of permanent magnets from becoming separated from the rotor by a centrifugal force, and a fixing groove formed at another side of the outer end configured to secure the injection ring, and prevent the injection ring from becoming separated from the rotor by a centrifugal force.

In accordance with another aspect of the present disclosure, a motor is provided. The motor includes a stator and a rotor rotatably disposed in the stator, the rotor may include at least one permanent magnet fixing core, at least one injection fixing core alternately stacked with the at least one permanent magnet core in a direction of a motor shaft, a plurality of permanent magnets inserted at a predetermined interval in the at least one permanent magnet fixing core and the at least one injection fixing core, and an injection ring formed to cover the at least one permanent magnet fixing core, the at least one injection fixing core, and the plurality of permanent magnets, wherein the at least one permanent magnet fixing core may be provided with a plurality of magnet fixing holes configured to receive the plurality of permanent magnets and a fixing protrusion formed at an outer end of each of the plurality of magnet fixing holes, and wherein the at least one injection fixing core may be provided with a plurality of magnet receiving holes configured to receive the plurality of permanent magnets and a fixing groove formed at an outer end of each of the plurality of magnet receiving holes.

In accordance with another aspect of the present disclosure, a method to secure a magnet within a rotor of a motor is provided. The method includes stacking a plurality of cores in a direction of a motor shaft, securing a plurality of magnets in the plurality of cores, and securing an injection ring to cover the plurality of cores and the plurality of magnets, wherein at least one core may include a plurality of magnet fixing holes configured to receive the plurality of magnets and a fixing protrusion formed at an outer end of each of the plurality of magnet fixing holes to secure each magnet within the magnet fixing holes of the rotor, and a fixing groove formed at the outer end of each of the plurality of magnet receiving holes to secure the injection ring over the magnet fixing holes of the rotor.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the spirit and scope of the present disclosure. In addition, descriptions of well-known functions and constructions may be omitted for clarity and conciseness.

The terms and words used in the following description and claims are not limited to the bibliographical meanings, but are merely used to enable a clear and consistent understanding of the present disclosure. Accordingly, it should be apparent to those skilled in the art that the following description of various embodiments of the present disclosure is provided for illustration purpose only, and not for the purpose of limiting the present disclosure as defined by the appended claims and their equivalents.

It is to be understood that the singular forms "a," "an," and "the," include plural referents unless the context clearly dictates otherwise. Thus, for example, reference to "a component surface" includes reference to one or more of such surfaces.

The matters defined herein, such as a detailed construction and elements thereof, are provided to assist in a comprehensive understanding of this description. Thus, it is apparent that various embodiments may be carried out without those defined matters. Also, well-known functions or constructions may be omitted to provide a clear and concise description of various embodiments. Further, dimensions of various elements in the accompanying drawings may be arbitrarily increased or decreased for assisting in a comprehensive understanding.

The terms "first", "second", and so forth, may be used to describe diverse components, but the components are not limited by the terms. The terms are only used to distinguish one component from the others.

In the present application, the terms "include" and "consist of" designate the presence of features, numbers, operations, components, elements, or a combination thereof that are written in the specification, but do not exclude the presence or possibility of addition of one or more other features, numbers, operations, components, elements, or a combination thereof.

Figure 3:
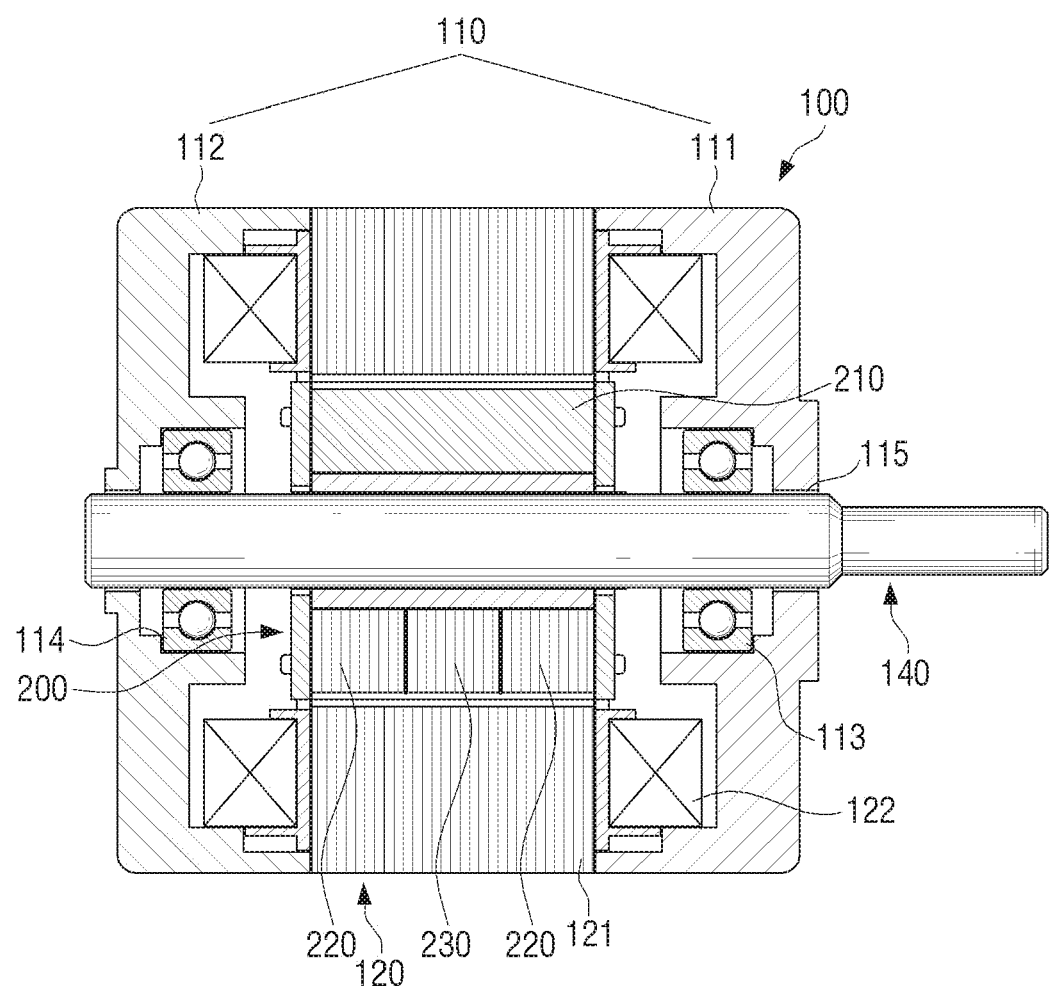
FIG. 3 is a cross-sectional view illustrating a motor taken along a motor shaft thereof according to an embodiment of the present disclosure.

FIG. 3 is a cross-sectional view illustrating a motor taken along a motor shaft thereof according to an embodiment of the present disclosure.

Referring to FIG. 3, a motor 100 according to an embodiment of the present disclosure includes a motor housing 110, a stator 120, a rotor 200, and a motor shaft 140.

The motor housing 110 forms an appearance of the motor 100, and includes a first housing 111 and a second housing 112 which can be separated in a direction of the motor shaft 140. The first housing 111 and the second housing 112 may be fixed to opposite sides of the stator 120.

The stator 120 is connected to the motor housing 110, and the rotor 200 is disposed in the stator 120. For example, the rotor 200 can be rotatably disposed within a center opening of the stator 120, and guided in rotation by a plurality of supports such as bearings disposed between the motor shaft 140 and the stator 120. The stator 120 includes a stator core 121 and a coil 122. The stator core 121 may be formed by laminating press processed iron plates, but embodiments are not limited thereto.

The rotor 200 is disposed in the stator 120. The rotor 200 is configured to rotate by electromagnetic interaction with the stator 120.

The motor shaft 140 is inserted into the center of the rotor 200, and is rotated integrally with the rotor 200. A portion of the motor shaft 140 is rotatably supported by a first bearing 113 in the first housing 111, and another portion of the motor shaft 140 is rotatably supported by a second bearing 114 in the second housing 112. An end portion of the motor shaft 140 projects outside the first housing 111 through an opening 115 formed in the first housing 111.

Hereinafter, the rotor 200 being used in a motor according to an embodiment of the present disclosure will be described in detail with reference to FIGS. 4A, 4B, 4C, and 5.

Figure 4A:
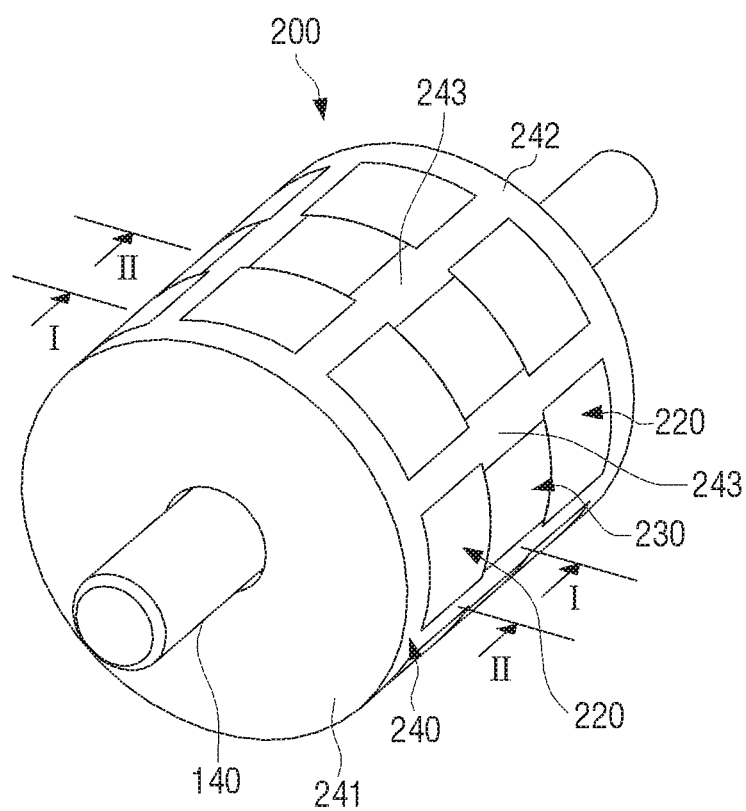
FIG. 4A is a perspective view illustrating a rotor of the motor of FIG. 3 according to an embodiment of the present disclosure.
Figure 4B:
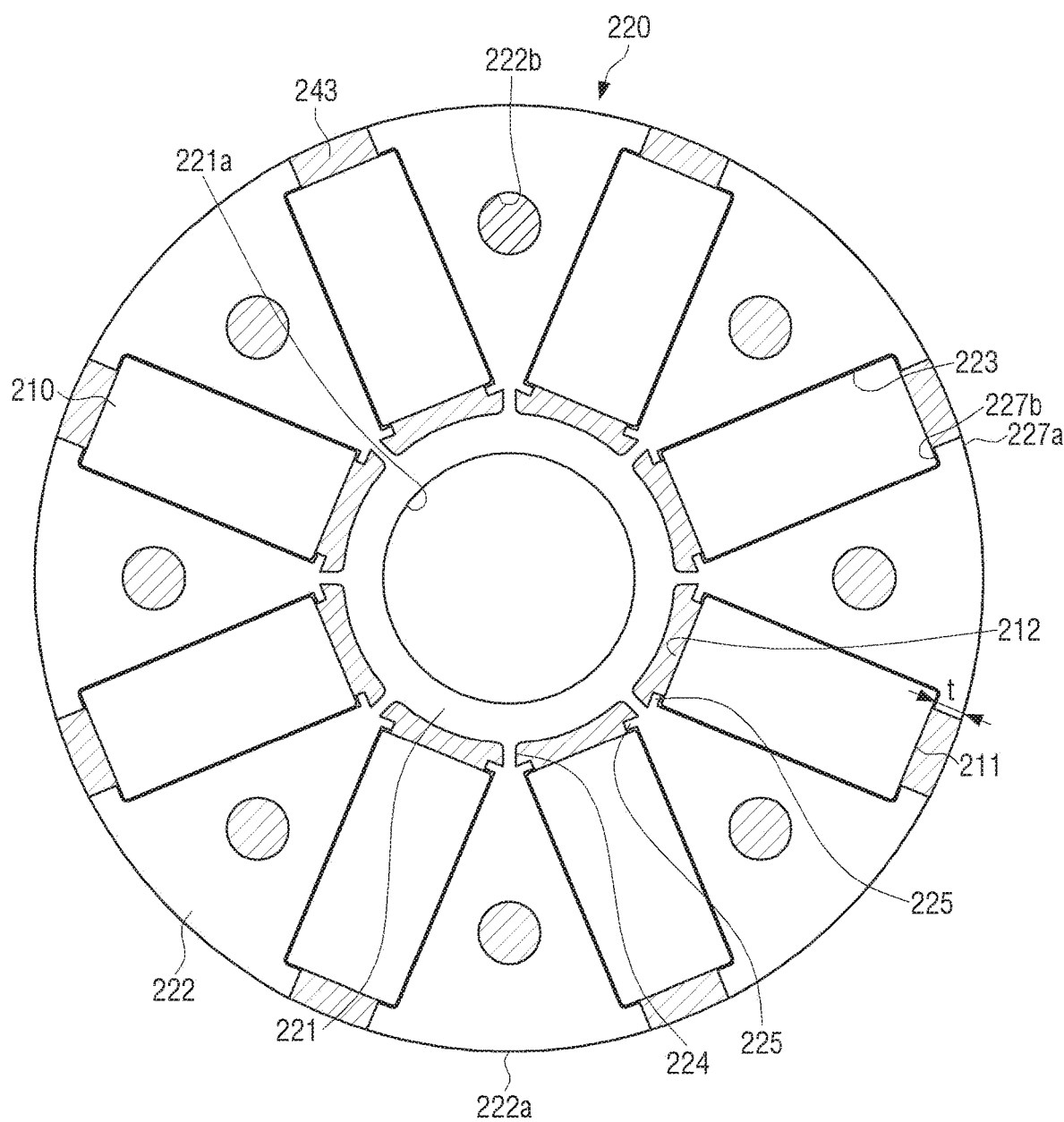
FIG. 4B is a cross-sectional view illustrating the rotor of FIG. 4A taken along a line I-I according to an embodiment of the present disclosure.
Figure 4C:
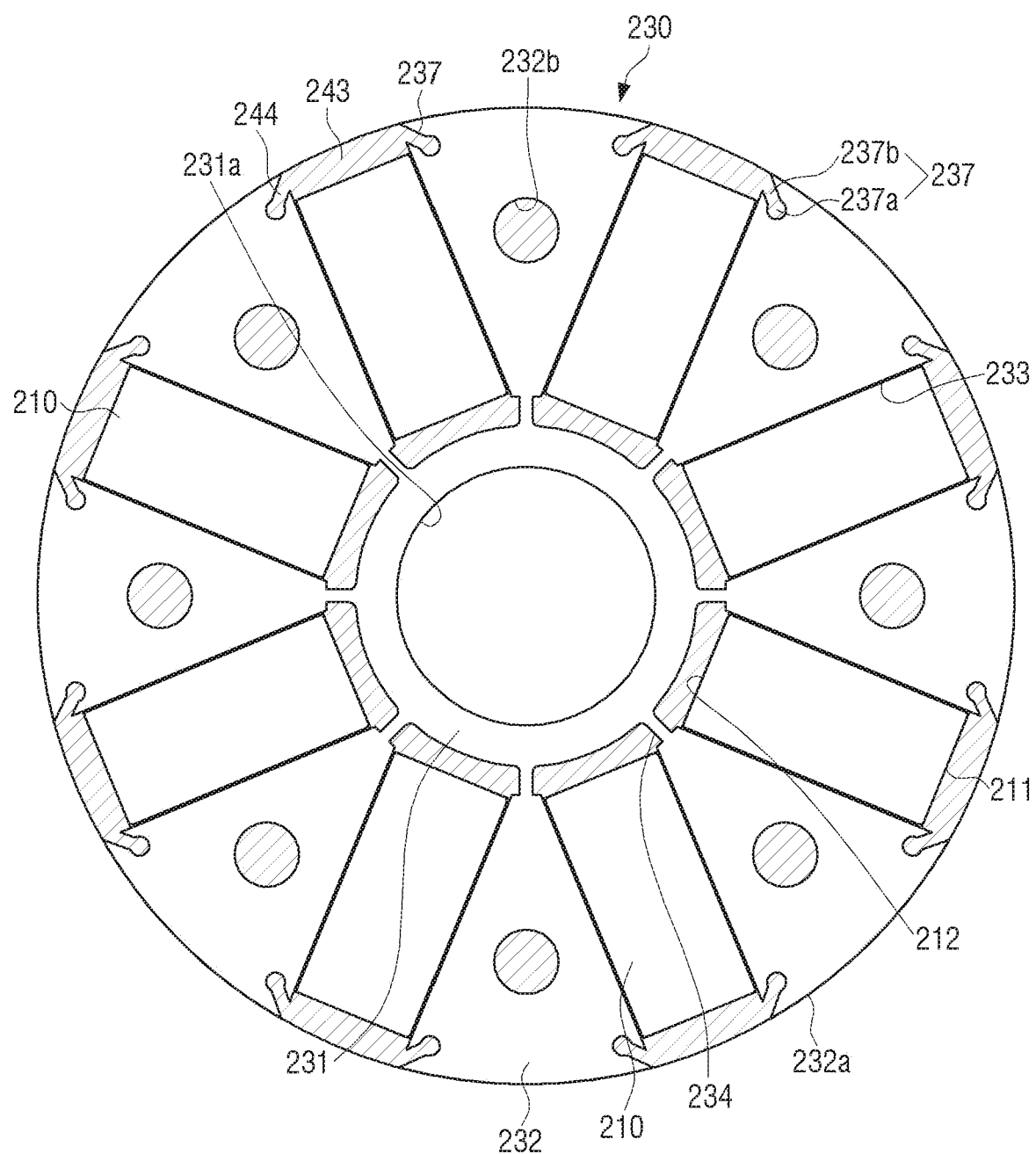
FIG. 4C is a cross-sectional view illustrating the rotor of FIG. 4A taken along a line II-II according to an embodiment of the present disclosure.
Figure 5:
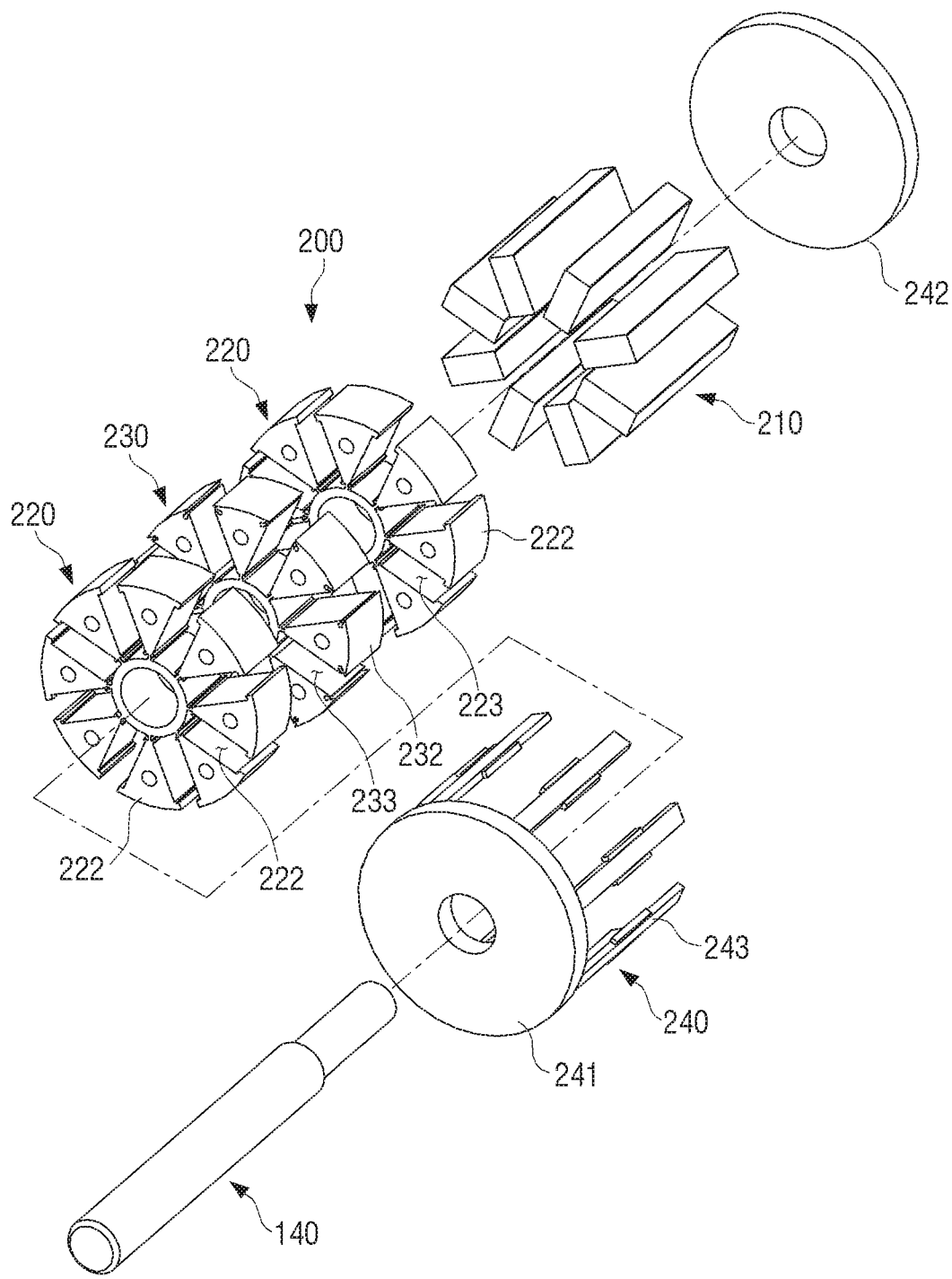
FIG. 5 is an exploded perspective view illustrating the rotor of FIG. 4A according to an embodiment of the present disclosure.

FIG. 4A is a perspective view illustrating a rotor of the motor of FIG. 3 according to an embodiment of the present disclosure. FIG. 4B is a cross-sectional view illustrating the rotor of FIG. 4A taken along a line I-I according to an embodiment of the present disclosure, and FIG. 4C is a cross-sectional view illustrating the rotor of FIG. 4A taken along a line II-II according to an embodiment of the present disclosure. FIG. 5 is an exploded perspective view illustrating the rotor of FIG. 4A according to an embodiment of the present disclosure.

Referring to FIGS. 3, 4A, 4B, 4C, and 5, the rotor 200 may include a plurality of permanent magnets 210, at least one permanent magnet fixing core 220, at least one injection fixing core 230, and an injection ring 240.

The plurality of permanent magnets 210 are disposed along a circumferential direction of the rotor 200 to be radially positioned relative to the motor shaft 140. In FIGS.

4A and 5, the rotor 200 is provided with eight permanent magnets 210. However, this is only one example and embodiments are not limited thereto. The number of the permanent magnets 210 may be changed in accordance with the specification of the motor 100. The permanent magnets 210 may be a ferrite magnet or a magnet including a rare-earth element such as neodymium or samarium.

Each permanent magnet 210 is disposed so that an inner end 212 of the permanent magnet 210 in the radial direction of the rotor 200 is adjacent to the motor shaft 140, and an outer end 211 of the permanent magnet 210 is adjacent to the stator 120. The permanent magnet 210 is formed in a substantially rectangular parallelepiped shape having a rectangular cross-section, and is disposed so that long sides of the rectangle are located in the radial direction of the rotor 200.

The permanent magnet fixing core 220 is provided to prevent the plurality of permanent magnets 210 from becoming separated from the rotor 200 by the centrifugal force generated when the rotor 200 rotates, and has a structure for fixing the plurality of permanent magnets 210.

Hereinafter, an example of the permanent magnet fixing core 220 will be described with reference to FIGS. 6A and 6B.

Figure 6A:
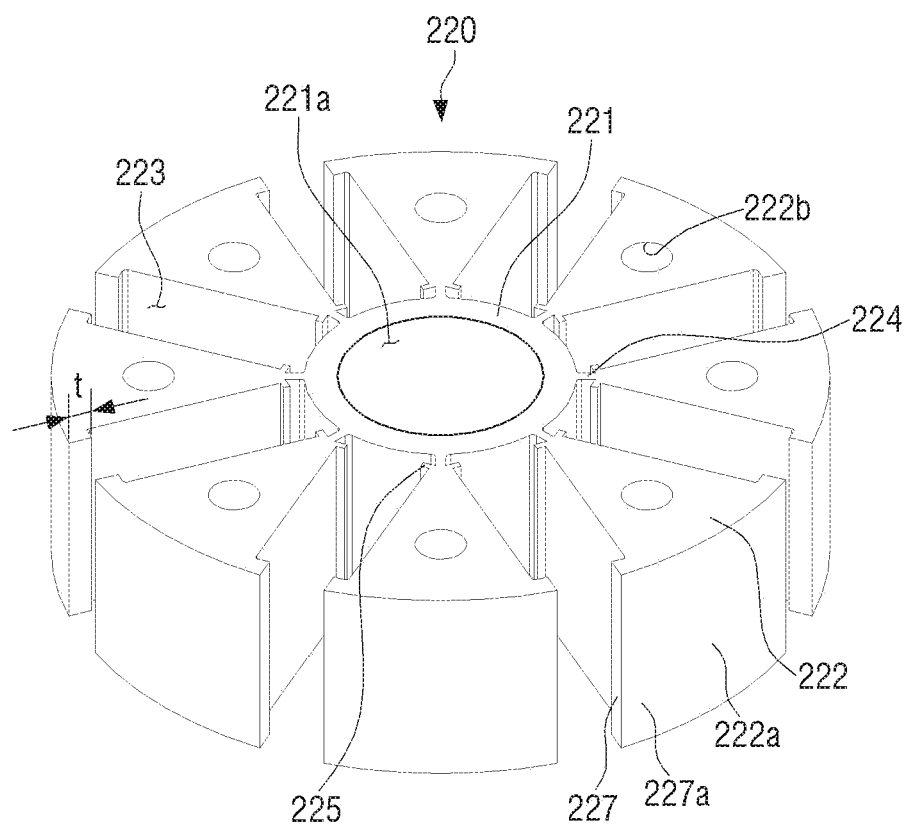
FIG. 6A is a perspective view illustrating a permanent magnet fixing core constituting a rotor of a motor according to an embodiment of the present disclosure.
Figure 6B:
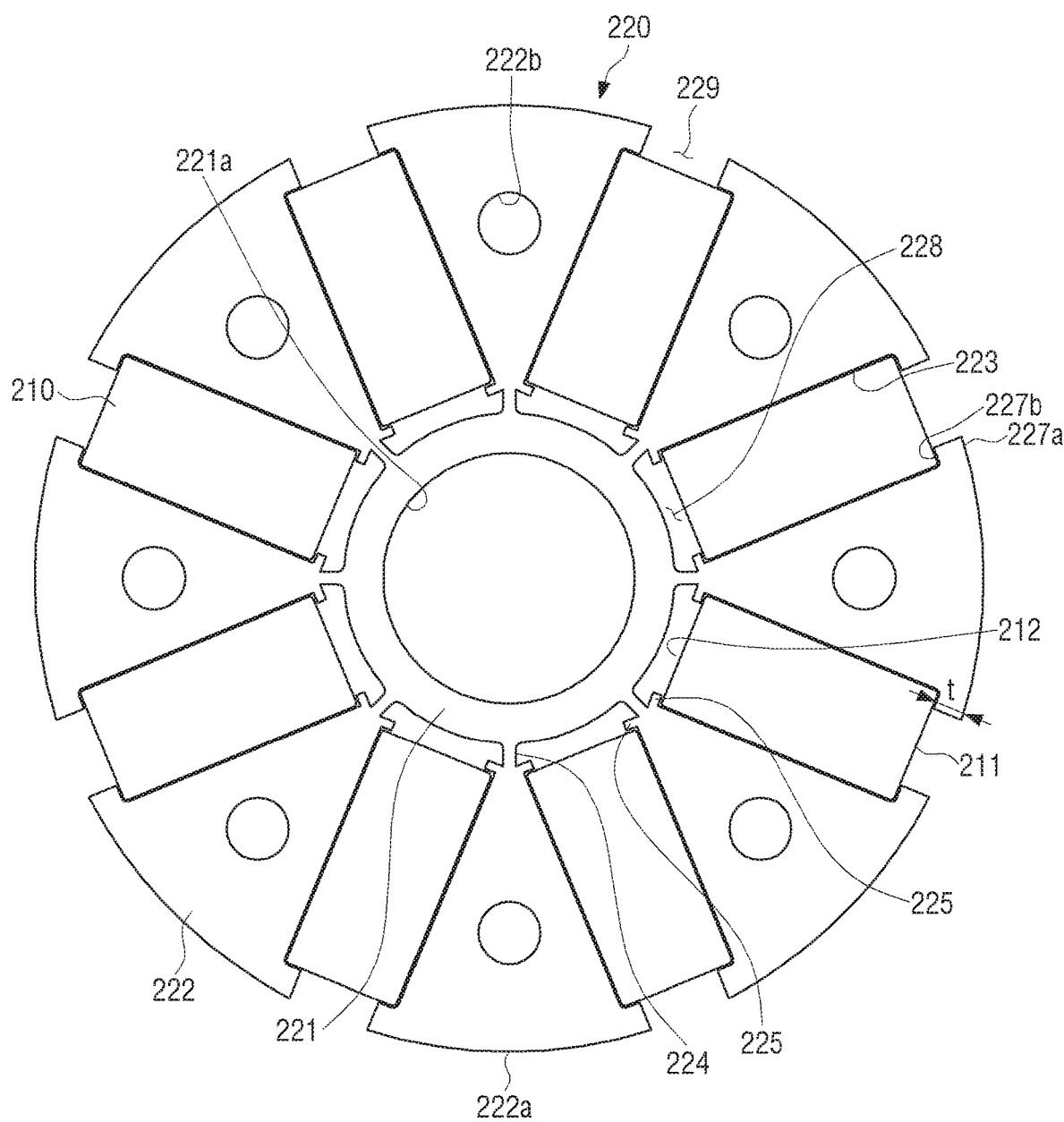
FIG. 6B is a view illustrating a state in which permanent magnets are disposed in the permanent magnet fixing core of FIG. 6A according to an embodiment of the present disclosure.

FIG. 6A is a perspective view illustrating a permanent magnet fixing core constituting a rotor of a motor according to an embodiment of the present disclosure, and FIG. 6B is a view illustrating a state in which permanent magnets are disposed in the permanent magnet fixing core of FIG. 6A according to an embodiment of the present disclosure.

Referring to FIGS. 6A and 6B, the permanent magnet fixing core 220 includes a hub 221 and a plurality of core arms 222.

The hub 221 is formed in an annular shape, and a shaft hole 221a into which the motor shaft 140 is inserted is formed in the center of the hub 221.

The plurality of core arms 222 are provided around the hub 221 to support the plurality of permanent magnets 210, and form passages for magnetic fluxes generated by the permanent magnets 210. The plurality of core arms 222 are disposed to be spaced apart at predetermined intervals in the circumferential direction to accommodate the plurality of permanent magnets 210. Accordingly, two adjacent core arms 222 form a magnet fixing hole 223 to receive the permanent magnet 210.

The plurality of core arms 222 may be connected to the hub via a plurality of bridges 224. The plurality of bridges 224 are formed on the outer circumference of the hub 221 in the circumferential direction to correspond to the plurality of core arms 222. In detail, each of the bridges 224 may extend in the radial direction from the outer surface of the hub 221 to the outside, and may be connected to the inner end of the core arm 222.

Figure 7A:
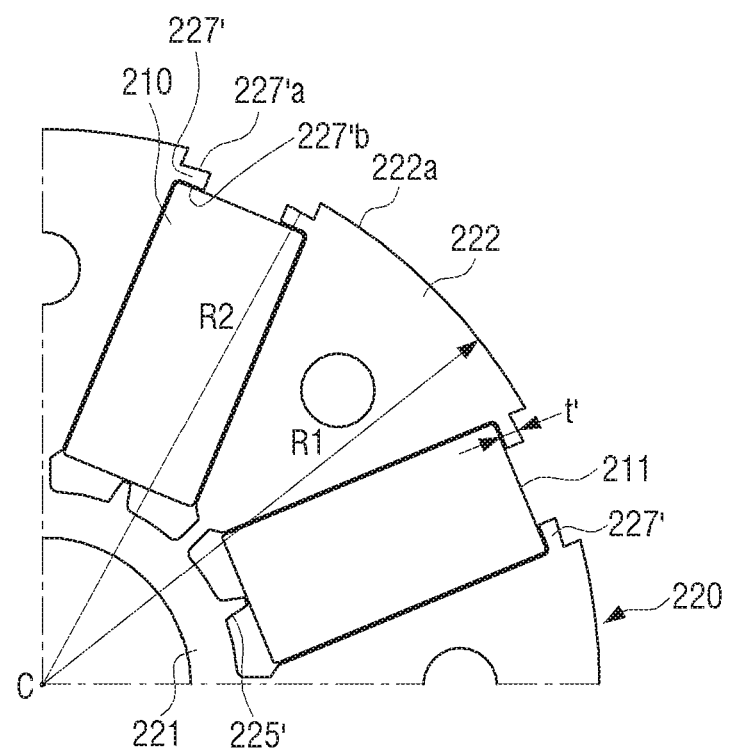
FIGS. 7A to 7C are partial views illustrating various examples of fixing protrusions of the permanent magnet fixing core of FIG. 6A according to an embodiment of the present disclosure.

Each core arm 222 is formed in a pillar shape having a cross-section of a substantially triangular shape, but embodiments are not limited thereto. The inner end of the core arm 222 adjacent to the hub 221 is provided with a supporting protrusion 225 to support the permanent magnet 210. The supporting protrusion 225 is formed so that the inner end 212 of the permanent magnet 210 is not in contact with and is spaced apart from the outer circumferential surface of the hub 221. In an embodiment as illustrated in FIG. 6B, the supporting protrusion 225 is formed to project from the inner end of the core arms 222. However, this is only one example and embodiments are not limited thereto. For example, a supporting protrusion 225' as illustrated in FIG. 7A, may be formed to project from the outer circumferential surface of the hub 221. In this case, a single supporting protrusion 225' may be formed to support the center of the inner end 212 of the permanent magnet 210.

The outer end of the core arm 222 is also provided with fixing protrusions 227 for preventing the permanent magnet 210 from being extracted from the magnet fixing hole 223. The outer circumferential surface 227a of the fixing protrusions 227 is formed in the same surface as the outer circumferential surface of the permanent magnet fixing core 220, that is, an outer circumferential surface 222a of the core arm 222. Here, an inner circumferential surface 227b of the fixing protrusion 227 refers to a surface in contact with the permanent magnet 210, and the outer circumferential surface 227a of the fixing protrusion 227 refers to the opposite surface of the inner circumferential surface 227b in contact with the permanent magnet 210.

Accordingly, the magnet fixing hole 223 formed by the two adjacent core arms 222 is provided with a pair of supporting protrusions 225 formed on the inside near the center C of the rotor 200 and a pair of fixing protrusions 227 formed on the outside away from the center C of the rotor 200. Accordingly, because the outer end 211 of the permanent magnet 210 inserted into the magnet fixing hole 223 is supported by the pair of the fixing protrusions 227, even when the rotor 200 rotates at a high speed, the permanent magnet 210 does not become extracted from the magnet fixing hole 223 by the centrifugal force. The thickness t of the fixing protrusions 227 may be determined as a size capable of preventing the permanent magnet 210 from being extracted from the magnet fixing hole 223 by the centrifugal force when the rotor 200 rotates at the maximum speed.

Referring to FIG. 6B, when the permanent magnet 210 is inserted into the magnet fixing hole 223, an inside space 228 is formed between the outer circumferential surface of the hub 221 and the inner end 212 of the permanent magnet 210. An outside space 229 is also formed between the outer end 211 of the permanent magnet 210 and the outer circumferential surface 222a of the permanent magnet fixing core 220. The inside space 228 and the outside space 229 are filled with a molding material to form the injection ring 240. If the core arm 222 is provided with a through hole 222b, the through hole 222b is also filled with the molding material.

The permanent magnet fixing core 220 having the above-described structure may be formed by laminating a plurality of core plates formed by press processing silicon steel sheets in the above-described shape.

In FIGS. 6A and 6B, the fixing protrusion 227 of the permanent magnet fixing core 220 is formed in a substantially rectangular shape having a uniform width; however, the shape of the fixing protrusion 227 is not limited thereto. The shape of the fixing protrusion 227 may be formed in variety of shapes capable of preventing the permanent magnet 210 from being extracted from the magnet fixing hole 223 by the centrifugal force when the rotate 200 rotates at the full speed.

Figure 7B:
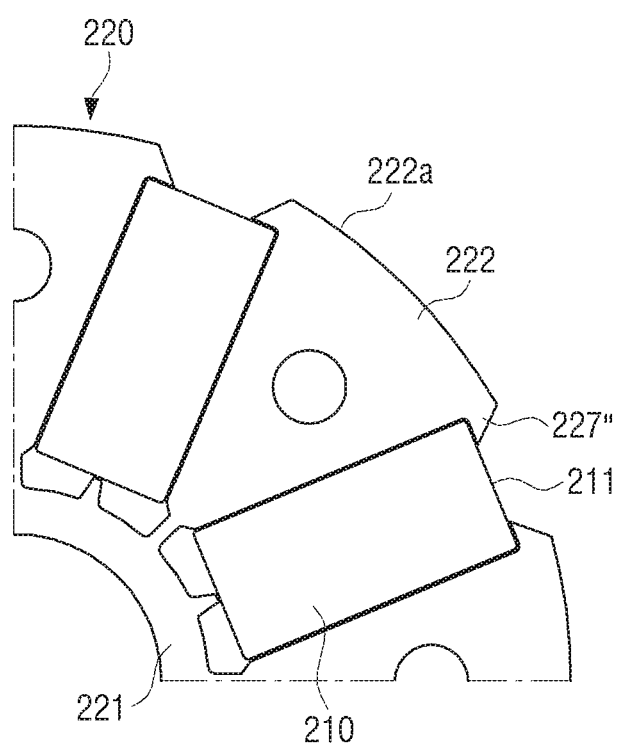
Figure 7C:
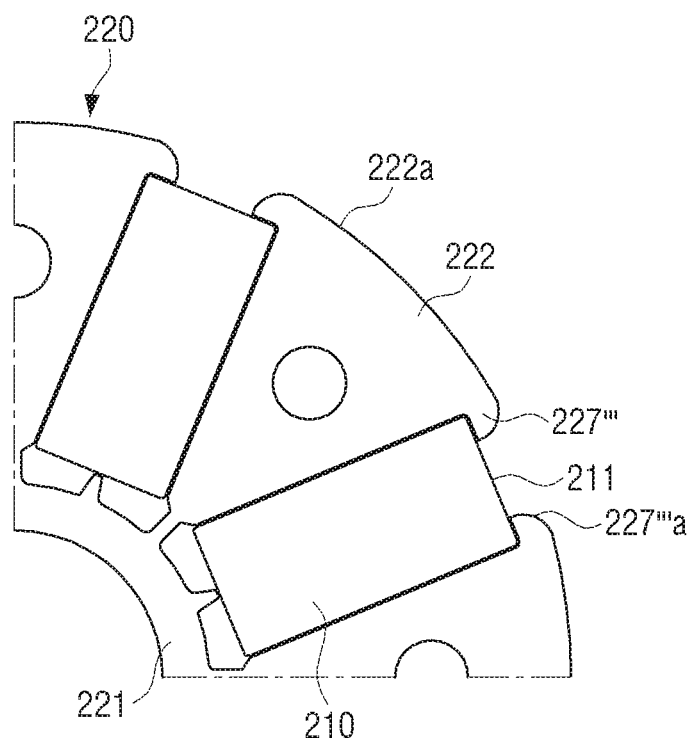

FIGS. 7A, 7B, and 7C are partial views illustrating various examples of a fixing protrusion of the permanent magnet fixing core of FIG. 6A according to an embodiment of the present disclosure.

Referring to FIG. 7A, a fixing protrusion 227' of the permanent magnet fixing core 220 may be formed so that a radius R2 of an outer surface 227'a that is the opposite surface of an inner surface 227'b which is in contact with the permanent magnet 210 inserted into the magnet fixing hole 223 is smaller than a radius R1 of the outer circumferential surface 222a of the core arm 222. In other words, the outer circumferential surface 222a of the core arm 222 and the fixing protrusion 227' are formed as a step. Accordingly, a thickness t' of the fixing protrusion 227' as illustrated in FIG. 7A is thinner than the thickness t of the fixing protrusion 227 as illustrated in FIG. 6B. The thickness t' of the fixing protrusion 227' may be determined as a size capable of preventing the permanent magnet 210 from being extracted from the magnet fixing hole 223 by the centrifugal force when the rotor 200 rotates at the maximum speed.

Referring to FIG. 7B, a fixing protrusion 227' of the permanent magnet fixing core 220 is formed in a substantially triangular shape having an inclined surface that is inclined from the outer circumferential surface 222a of the core arm 222 toward the outer end 211 of the permanent magnet 210.

Referring to FIG. 7C, a fixing protrusion 227''' of the permanent magnet fixing core 220 has a substantially triangular shape as illustrated in FIG. 7B, but is different in that an inclined surface 227''' a is formed as a curved surface.

Like the fixing protrusion 227' of FIG. 7A, the fixing protrusions 227'' and 227''' of FIGS. 7B and 7C may be determined to prevent the permanent magnet 210 from being extracted from the magnet fixing hole 223 by the centrifugal force when the rotor 200 rotates at the maximum speed.

The injection fixing core 230 is to prevent a plurality of connecting bars 243 of the injection ring 240 that cover the outer ends 211 of the plurality of permanent magnets 210 from becoming separated from the rotor 200 by the centrifugal force generated when the rotor 200 rotates, and has a structure for fixing the plurality of connecting bars 243 of the injection ring 240.

Hereinafter, an example of the injection fixing core 230 will be described with reference to FIGS. 8A and 8B.

Figure 8A:
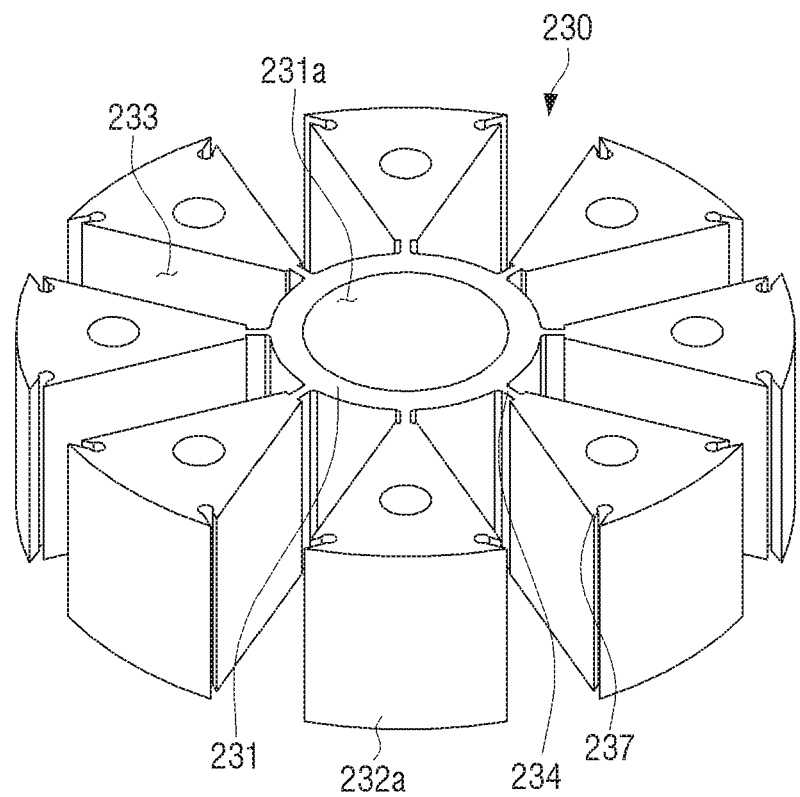
FIG. 8A is a perspective view illustrating an injection fixing core constituting a rotor of a motor according to an embodiment of the present disclosure.
Figure 8B:
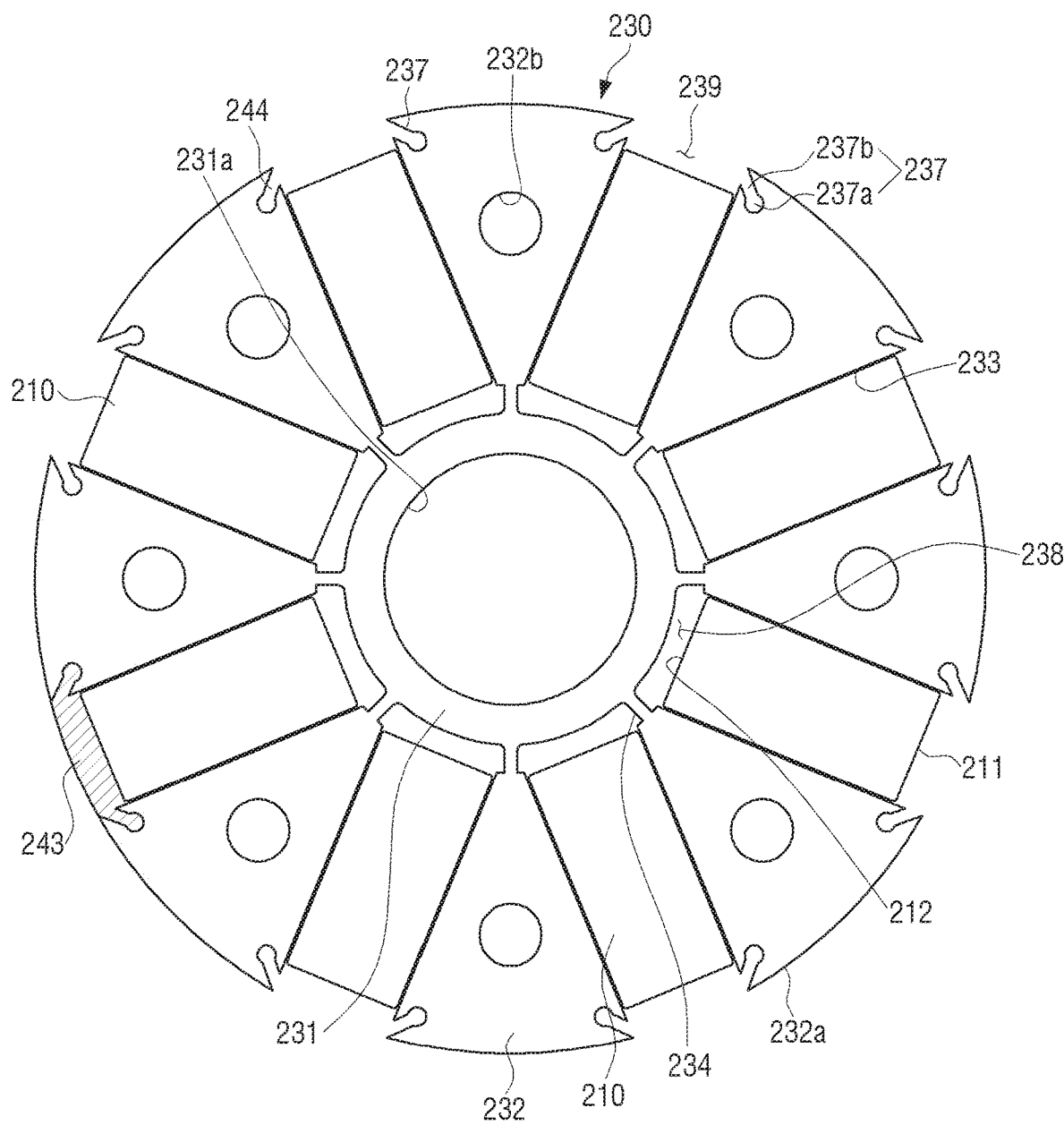
FIG. 8B is a view illustrating a state in which permanent magnets are disposed in the injection fixing core of FIG. 8A according to an embodiment of the present disclosure.

FIG. 8A is a perspective view illustrating an injection fixing core constituting a rotor of a motor according to an embodiment of the present disclosure, and FIG. 8B is a view illustrating a state in which permanent magnets are disposed in the injection fixing core of FIG. 8A according to an embodiment of the present disclosure.

Referring to FIGS. 8A and 8B, the injection fixing core 230 includes a hub 231 and a plurality of core arms 232.

The hub 231 is formed in an annular shape, and a shaft hole 231a into which the motor shaft 140 is inserted is formed in the center of the hub 231.

The plurality of core arms 232 are provided around the hub 231 to support the plurality of permanent magnets 210, and form passages for magnetic fluxes generated from the permanent magnets 210. The plurality of core arms 232 are disposed to be spaced apart at predetermined intervals in the circumferential direction of the rotor 200 to accommodate the plurality of permanent magnets 210. Accordingly, two adjacent core arms 232 form a magnet receiving hole 233 that receives the permanent magnet 210.

The plurality of core arms 232 may be connected to the hub 231 via a plurality of bridges 234. The plurality of bridges 234 are formed on the outer circumference of the hub 231 in the circumferential direction to correspond to the plurality of core arms 232. In detail, each of the bridges 234 may extend in the radial direction from the outer surface of the hub 231 to the outside, and may be connected to the inner end of the corresponding core arm 232. The core arm 232 may be formed in a pillar shape having a cross-section of a substantially triangular shape, but embodiments are not limited thereto.

Each core arm 232 of the injection fixing core 230 is also provided with fixing grooves 237 for preventing a connecting bar 243 of the injection ring 240 from becoming separated from the rotor 200 near the outer end of the core arm 232. The fixing groove 237 is formed to be inclined at a certain angle with respect to the magnet receiving hole 233 toward the inside of the core arm 232 from the outer circumferential surface of the injection fixing core 230, that is, the outer circumferential surface 232a of the core arm 232. A projecting portion 244 of the connecting bar 243 of the injection ring 240 is inserted into the fixing groove 237. Accordingly, the projecting portion 244 of the connecting bar 243 of the injection ring 240 is formed in the same shape as the fixing groove 237.

Referring to FIGS. 4C and 8B, the fixing groove 237 includes a head portion 237a for fixing the projecting portion 244, and a neck portion 237b for connecting the head portion 237a and the magnet receiving hole 233. The head portion 237a of the fixing groove 237 as illustrated in FIG. 8B is formed in a circular shape. Since a width of the head portion 237a of the fixing groove 237, that is, the diameter of the head portion 237a is larger than a width of the neck portion 237b, the projecting portion 244 of the connecting bar 243 of the injection ring 240 inserted into the fixing groove 237 will not become extracted from the fixing groove 237.

Accordingly, the magnet receiving hole 233 formed by two adjacent core arms 232 is provided with a pair of fixing grooves 237 at the outer end of the magnet receiving hole 233 in the radial direction from the center of the rotor 200. In other words, the pair of fixing grooves 237 are provided in both side surfaces of the outer end of the magnet receiving hole 233 that is in fluid communication with the outer circumferential surface of the injection fixing core 230. Accordingly, since the connecting bar 243 of the injection ring 240 covering the outer end 211 of the permanent magnet 210 inserted into the magnet receiving hole 233 is fixed by the pair of fixing grooves 237, even when the rotor 200 rotates at high speed, the connecting bar 243 will not become separated from the permanent magnet 210 by the centrifugal force. The size and shape of the fixing groove 237 may be determined to prevent the connecting bar 243 of the injection ring 240 from becoming separated from the permanent magnet 210 by the centrifugal force when the rotor 200 rotates at the maximum speed.

When the permanent magnet 210 is inserted into the magnet receiving hole 233, an inside space 238 is formed between the outer circumferential surface of the hub 231 and the inner end 212 of the permanent magnet 210. The inside space 238 is formed in substantially the same manner as the inside space 228 of the above-described permanent magnet fixing core 220. An outside space 239 is also formed between the outer end 211 of the permanent magnet 210 and the outer circumferential surface of the injection fixing core 230. The inside space 238 and the outside space 239 are filled with the molding material so as to form the injection ring 240 as illustrated in FIG. 4C. If the core arm 232 is provided with a through hole 232b, the through hole 232b is also filled with the molding material. In particular, the molding material filled in the outside spaces 229 and 239 between the outer ends of the permanent magnets 210 and the outer circumferential surfaces of the permanent magnet fixing core 220 and the injection fixing core 230 forms the connecting bars 243 of the injection ring 240.

The injection fixing core 230 having the above-described structure may be formed by laminating a plurality of core plates formed by press processing silicon steel sheets in the above-described shape.

In FIGS. 8A and 8B, the fixing grooves 237 of the injection fixing core 230 are formed in a circular shape; however, the shape of the fixing groove 237 is not limited thereto. The shape of the fixing groove 237 may be formed in variety of shapes capable of preventing the connecting bars 243 of the injection ring 240 from becoming separated from the rotor 200 by the centrifugal force when the rotor 200 rotates at the full speed.

Figure 9A:
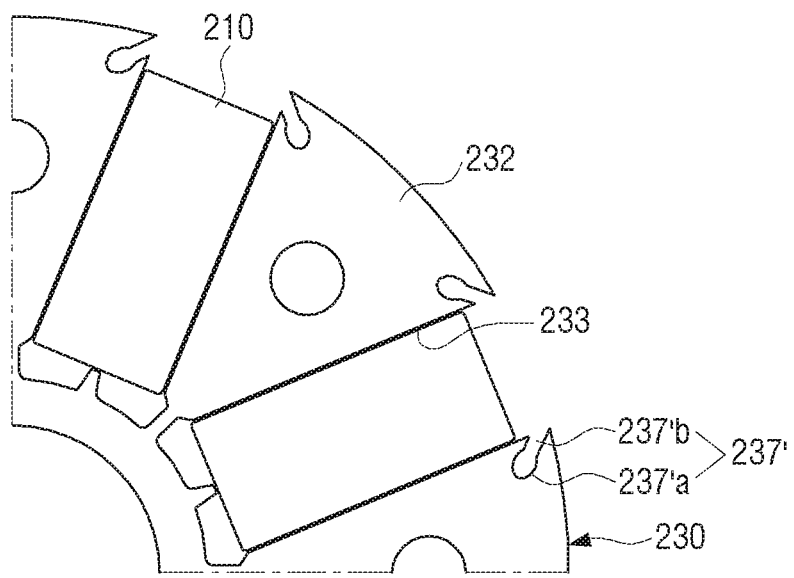
FIGS. 9A to 9C are partial views illustrating various examples of fixing grooves of an injection fixing core constituting a rotor of a motor according to an embodiment of the present disclosure.
Figure 9B:
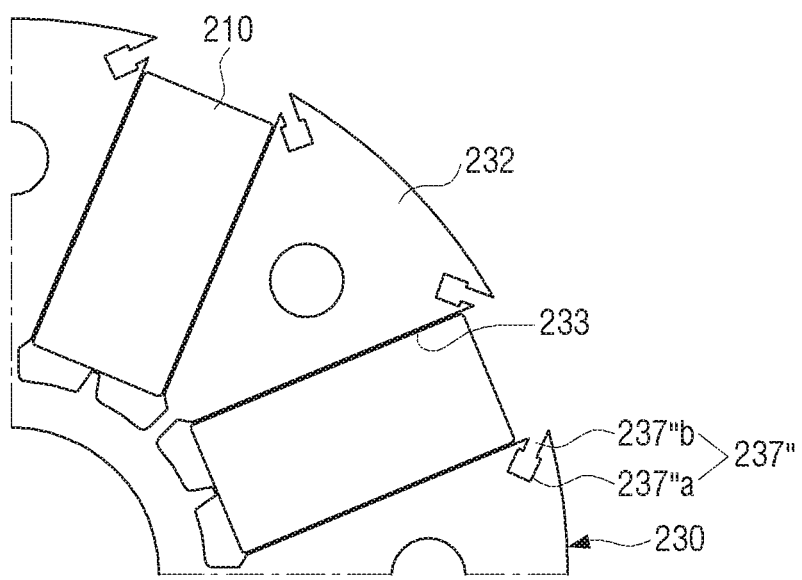
Figure 9C:
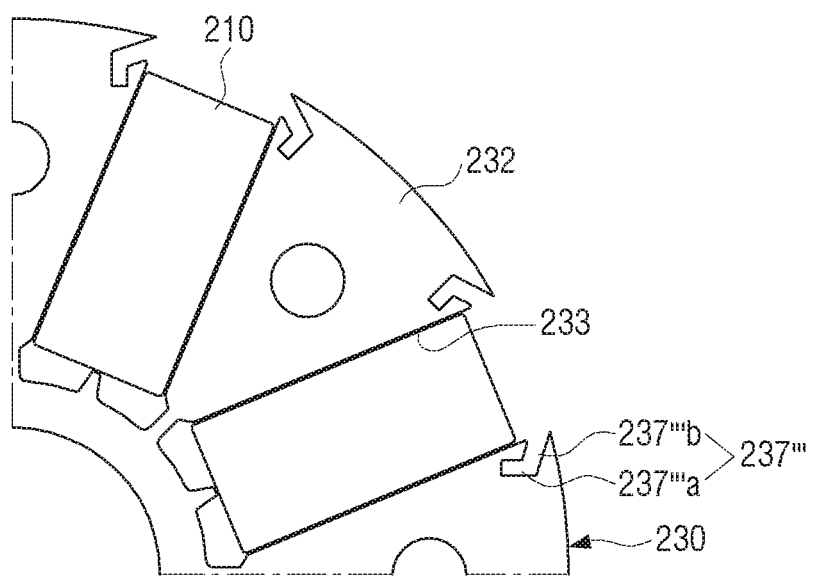

FIGS. 9A, 9B, and 9C are partial views illustrating various examples of a fixing groove of an injection fixing core constituting a rotor of a motor according to an embodiment of the present disclosure.

Referring to FIG. 9A, a head portion 237′a of a fixing groove 237′ is formed in a substantially elliptical shape, and the ellipse of the head portion 237′a is in fluid communication with the outside of the injection fixing core 230 via a slit of a neck portion 237′b.

Referring to FIG. 9B, a head portion 237″a of a fixing groove 237″ is formed in a substantially rectangular shape, and the rectangle of the head portion 237″a is in fluid communication with the outside of the injection fixing core 230 via a slit of a neck portion 237″b.

Referring to FIG. 9C, a head portion 237′a of a fixing groove 237′ is formed in a substantially slit shape, and the head portion 237′a is in fluid communication with the outside of the injection fixing core 230 via a neck portion 237′b. Because the slit of the head portion 237′a forms a certain angle with the slit of the neck portion 237′b, the projecting portion 244 of the connecting bar 243 of the injection ring 240 inserted into the fixing groove 237′ cannot become extracted from the fixing groove 237′.

The injection ring 240 is used to secure the permanent magnets 210 and to reduce noise. The injection ring 240 is formed to wrap at least one permanent magnet fixing core 220, at least one injection fixing core 230, and a plurality of permanent magnets 210 constituting an assembled rotor 200. For this, the assembled permanent magnet fixing core 220, injection fixing core 230, and plurality of permanent magnets 210 are mounted in a mold (not illustrated), and are then molded by injecting plastic or resin, thereby obtaining the rotor 200 of which the permanent magnet fixing core 220, the injection fixing core 230, the plurality of permanent magnets 210, and the injection ring 240 are integrated as a single body.

The injection ring 240 is formed to cover the opposite ends of the rotor 200 and to fill the inside spaces 228 and 238 and the outside spaces 229 and 239 between the permanent magnet fixing cores 220, the injection fixing core 230, and the plurality of permanent magnets 210 which are assembled. For example, the injection ring 240 may include two circular plates 241 and 242 covering the opposite ends of the rotor 200 and the plurality of connecting bars 243 which connect the two circular plates 241 and 242, and cover the outer ends 211 of the plurality of permanent magnets 210 connected to the permanent magnet fixing core 220 and the injection fixing core 230. In FIG. 5, one circular plate 242 is separated from the injection ring 240; however, this is only for ease of illustration. The two circular plates 241 and 242 and the plurality of connecting bars 243 are formed as a single body by an insert injection molding.

When the rotor 200 rotates at a high speed, the plurality of connecting bars 243 located on the outer circumferential surface of the rotor 200 are easily separated from the permanent magnets 210 by the centrifugal force. In order to prevent this, the present disclosure is configured so that the fixing groove 237 of the injection fixing core 230 fixes the projecting portion 244 of the connecting bar 243 of the injection ring 240. Accordingly, even when the rotor 200 rotates, the connecting bars 243 of the injection ring 240 do not become separated from the rotor 200.

The permanent magnet fixing core 220 and the injection fixing core 230 constituting the rotor 200 of the motor 100 according to an embodiment of the present disclosure may be stacked in a variety of methods.

For example, when the rotor 200 including the injection ring 240 rotates at a high speed, deformation potential of the injection ring 240 due to the centrifugal force is greatest near the middle of the connecting bar 243. Accordingly, when stacking the permanent magnet fixing cores 220 and the injection fixing cores 230, the injection fixing core 230 may be arranged to be positioned in the middle. However, an assembly position of the injection fixing core 230 is not limited thereto. The injection fixing core 230 may be stacked to be positioned on either side of the rotor 200.

Hereinafter, a stacking method of permanent magnet fixing cores and injection fixing cores will be described with reference to FIGS. 10A, 10B, and 11.

Figure 10A:
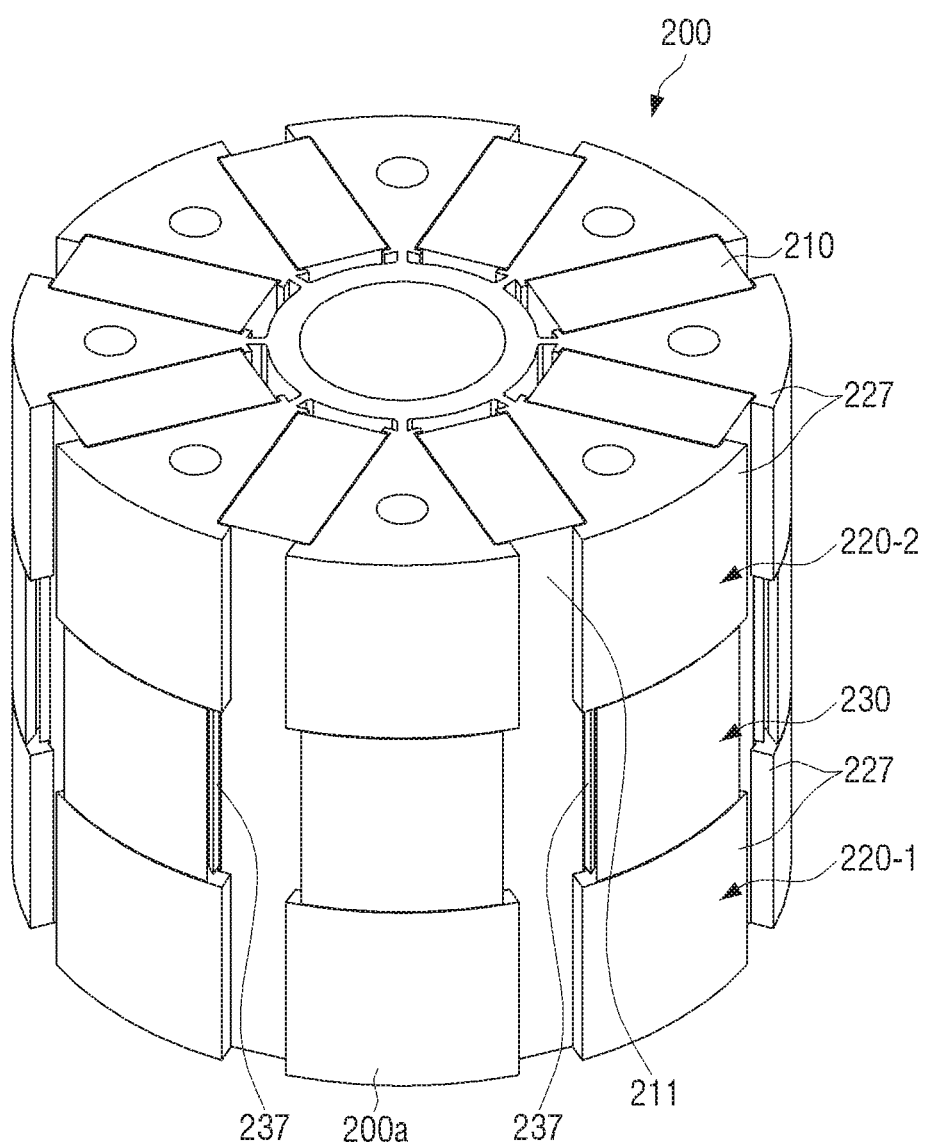
FIG. 10A is a perspective view illustrating an example of a stacked state of permanent magnet fixing cores and injection fixing cores constituting a rotor of a motor according to an embodiment of the present disclosure.

FIG. 10A is a perspective view illustrating an example of a stacked state of permanent magnet fixing cores and injection fixing cores constituting a rotor of a motor according to an embodiment of the present disclosure.

Referring to FIG. 10A, the rotor 200 is formed so that one injection fixing core 230 and two permanent magnet fixing cores, that is, first and second permanent magnet fixing cores 220-1 and 220-2 are stacked. In detail, the rotor 200 is configured so that the first permanent magnet fixing core 220-1 is placed on the bottom, the injection fixing core 230 is placed thereon, and the second permanent magnet fixing core 220-2 is disposed on the top of the injection fixing core 230.

As described above, each of the plurality of permanent magnets 210 is inserted into the magnet receiving hole 233 of the injection fixing core 230 and the magnet fixing hole 223 of each of the two permanent magnet fixing cores 220-1 and 220-2.

Accordingly, when the rotor 200 rotates at a high speed, the separation of any of the permanent magnets 210 inserted into the magnet fixing holes 223 and the magnet receiving holes 233 by the centrifugal force is blocked by the fixing protrusions 227 of the two permanent magnet fixing cores 220-1 and 220-2. Also, since the connecting bars 243 of the injection ring 240 which will be filled in the spaces between the outer circumferential surface 200a of the rotor 200 and the outer ends 211 of the plurality of permanent magnets 210 are fixed by the fixing grooves 237 of the injection fixing core 230, the connecting bars 243 cannot become separated from the rotor 200 by the centrifugal force. Since the injection fixing core 230 is located in the middle of the rotor 200, separation and deformation of the connecting bars 243 of the injection ring 240 due to the centrifugal force may be effectively prevented.

Figure 10B:
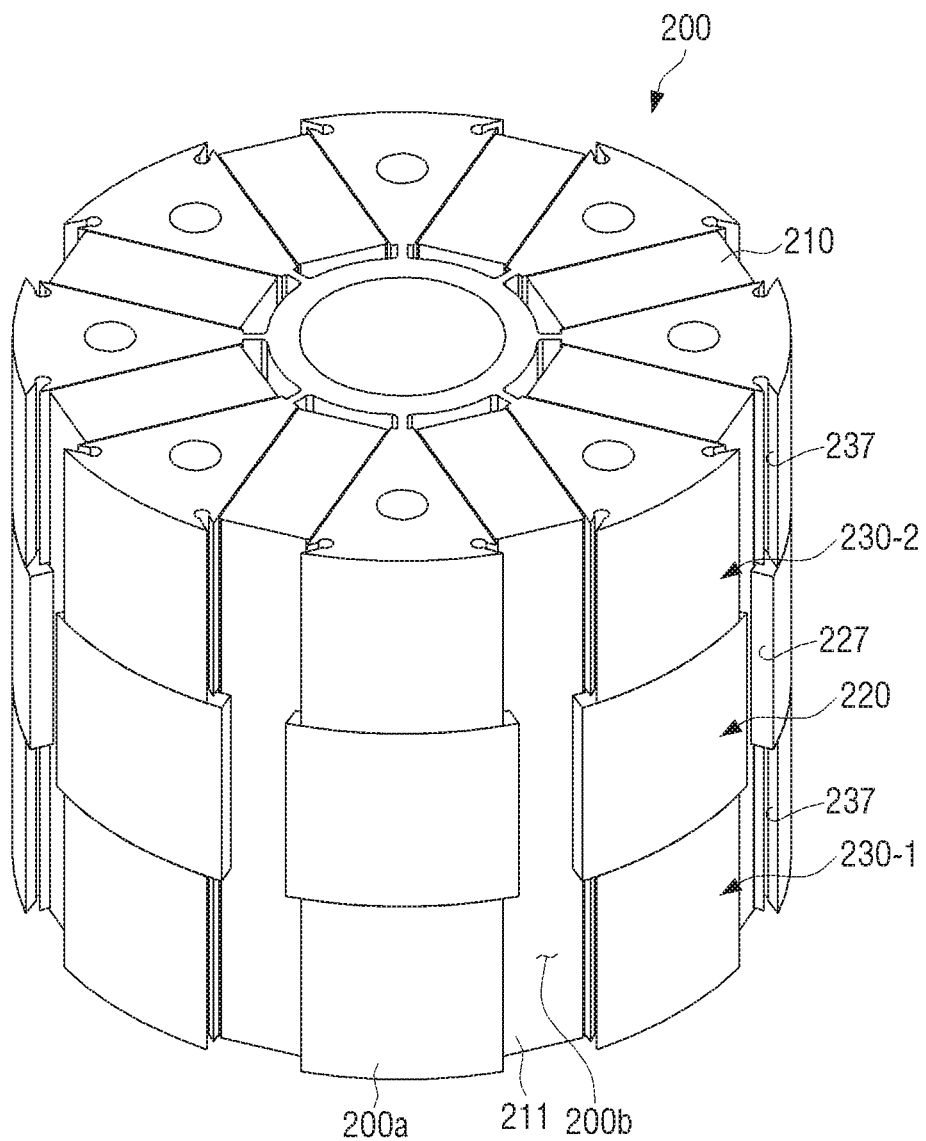
FIG. 10B is a perspective view illustrating another example of a stacked state of permanent magnet fixing cores and injection fixing cores constituting a rotor of a motor according to an embodiment of the present disclosure.

FIG. 10B is a perspective view illustrating another example of a stacked state of permanent magnet fixing cores and injection fixing cores constituting a rotor of a motor according to an embodiment of the present disclosure.

Referring to FIG. 10B, the rotor 200 is formed so that one permanent magnet fixing core 220 and two injection fixing cores, that is, first and second injection fixing cores 230-1 and 230-2 are stacked. In detail, the rotor 200 is configured so that the first injection fixing core 230-1 is placed on the bottom, the permanent magnet fixing core 220 is placed thereon, and the second injection fixing core 230-2 is disposed on the top of the permanent magnet fixing core 220.

As described above, each of the plurality of permanent magnets 210 is inserted into the magnet receiving holes 233 of the two injection fixing cores 230-1 and 230-2 and the magnet fixing hole 223 of the permanent magnet fixing core 220.

Accordingly, when the rotor 200 rotates at a high speed, the separation of any of the permanent magnets 210 inserted into the magnet fixing holes 223 and the magnet receiving holes 233 by the centrifugal force is blocked by the fixing protrusions 227 of the single permanent magnet fixing core 220. Also, since the connecting bars 243 of the injection ring 240 which will be filled in the spaces 200b between the outer circumferential surface 200a of the rotor 200 and the outer ends 211 of the plurality of permanent magnets 210 are fixed by the fixing grooves 237 of the two injection fixing cores 230-1 and 230-2, the connecting bars 243 cannot become separated from the rotor 200 by the centrifugal force.

Figure 11:
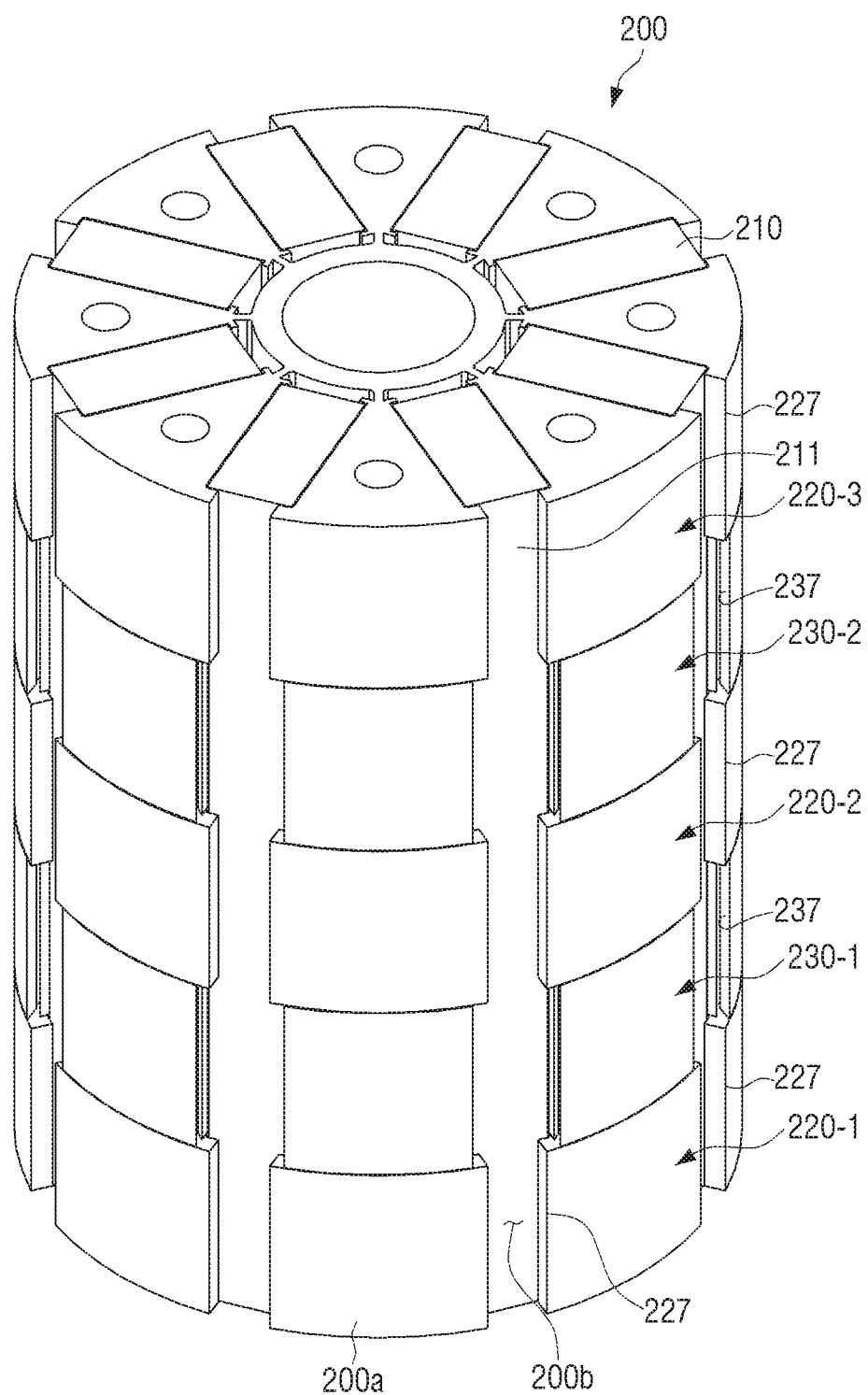
FIG. 11 is a perspective view illustrating another example of a stacked state of permanent magnet fixing cores and injection fixing cores constituting a rotor of a motor according to an embodiment of the present disclosure.

FIG. 11 is a perspective view illustrating another example of a stacked state of permanent magnet fixing cores and injection fixing cores constituting a rotor of a motor according to an embodiment of the present disclosure.

Referring to FIG. 11, the rotor 200 is formed so that two injection fixing cores 230 and three permanent magnet fixing cores 220 are stacked. Hereinafter, for convenience of explanation, the two injection fixing cores 230 are respectively referred to as a first injection fixing core 230-1 and a second injection fixing core 230-2, and the three permanent magnet fixing cores 220 are respectively referred to as a first permanent magnet fixing core 220-1, a second permanent magnet fixing core 220-2, and a third permanent magnet fixing core 220-3.

In detail, the first permanent magnet fixing core 220-1 is placed on the bottom, the first injection fixing core 230-1 is stacked on the top of the first permanent magnet fixing core 220-1, the second permanent magnet fixing core 220-2 is stacked on the top of the first injection fixing core 230-1. The second injection fixing core 230-2 is stacked on the top of the second permanent magnet fixing core 220-2, and the third permanent magnet fixing core 220-3 is stacked on the top of the second injection fixing core 230-2, so that the stack of the rotor 200 is completed. In the present embodiment, the three permanent magnet fixing cores 220-1, 220-2, and 220-3 and the two injection fixing cores 230-1 and 230-2 are stacked alternately in the motor shaft direction in the order that the first permanent magnet fixing core 220-1 is first, the first injection fixing core 230-1 is stacked thereon, and then the second permanent magnet fixing core 220-2 is stacked thereon. Accordingly, the three permanent magnet fixing cores 220-1, 220-2, and 220-3 and the two injection fixing cores 230-1 and 230-2 are stacked alternately. Also, the three permanent magnet fixing cores 220-1, 220-2, and 220-3 and the two injection fixing cores 230-1 and 230-2 are stacked so that the first fixing core and the final fixing core constituting the rotor 200 are the permanent magnet fixing core 220-1 and 220-3. When being stacked in this way, the two injection fixing cores 230-1 and 230-2 are positioned between the three permanent magnet fixing cores 220-1, 220-2, and 220-3 so that the connecting bars 243 of the injection ring 240 may be prevented from becoming separated from the permanent magnets 210 by the centrifugal force.

Although not illustrated, as another embodiment, two permanent magnet fixing cores 220 and three injection fixing cores 230 may be sequentially stacked to form the rotor 200. An injection fixing core is placed on the bottom, and the permanent magnet fixing cores and the injection fixing cores are alternately stacked thereon so that the injection fixing core is positioned at the top.

In the above description, the total number of the permanent magnet fixing cores 220 and the injection fixing cores 230 to be stacked is three and five. However, the above-described method may be equally applied even when the total number of the permanent magnet fixing cores 220 and the injection fixing cores 230 to be stacked is seven or more.

In the above description, the permanent magnet fixing core 220 is provided with a pair of fixing protrusions 227 formed in the magnet fixing hole 223, and the injection fixing core 230 is provided with a pair of fixing grooves 237 formed in the magnet receiving hole 233. However, the magnet fixing hole 223 of the permanent magnet fixing core 220 may be provided with a single fixing protrusion 227, and the magnet receiving hole 233 of the injection fixing core 230 may be provided with a single fixing groove 237, each on the same sides of the fixing hole, on opposite sides of the fixing holes, or in an combination of sides of the fixing holes.

Hereinafter, a case in which the magnet fixing hole of the permanent magnet fixing core is provided with a single fixing protrusion will be described with reference to FIGS. 12A and 12B.

Figure 12A:
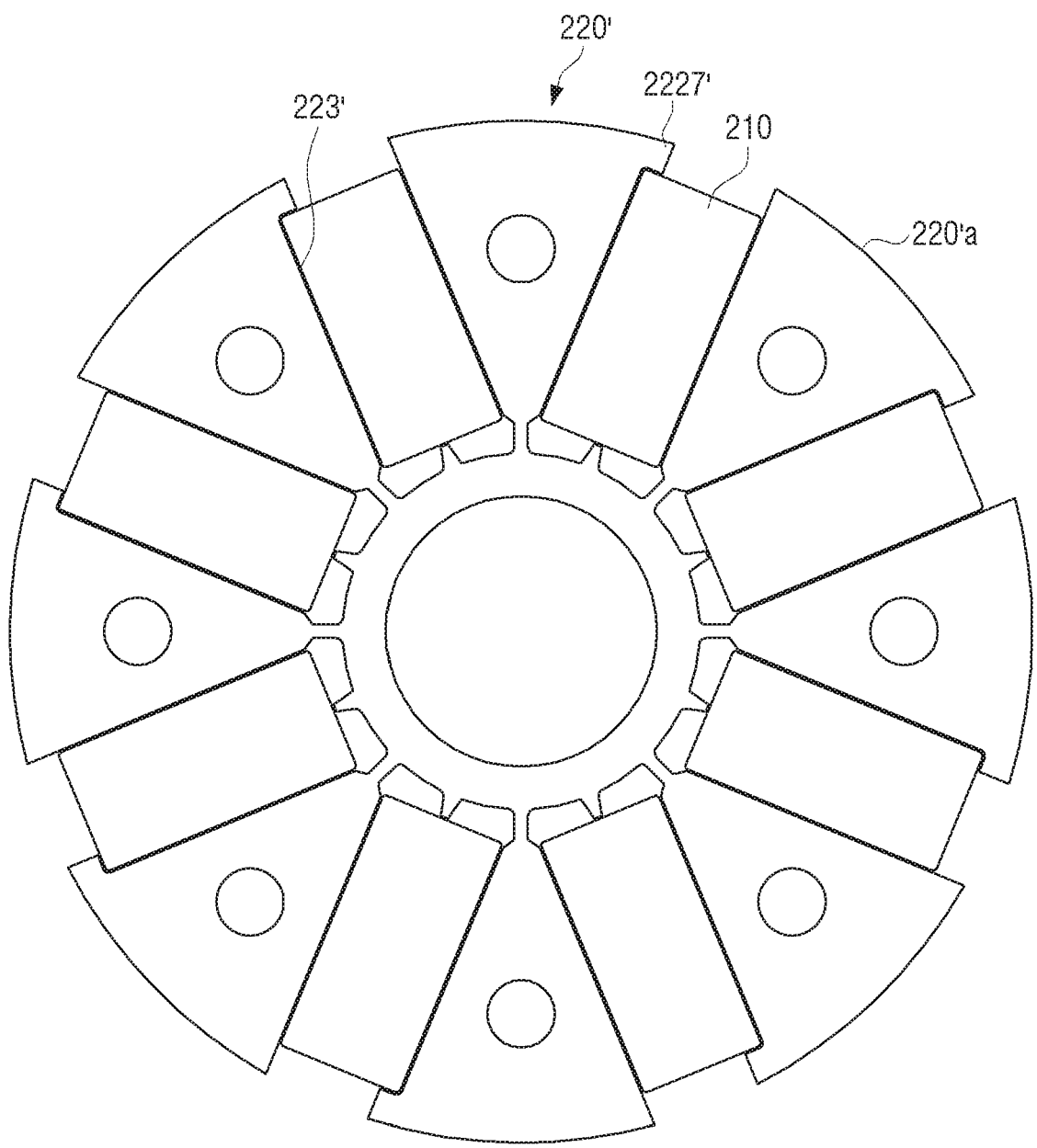
FIG. 12A is a view illustrating a first variation of a permanent magnet fixing core constituting a rotor of a motor according to an embodiment of the present disclosure.
Figure 12B:
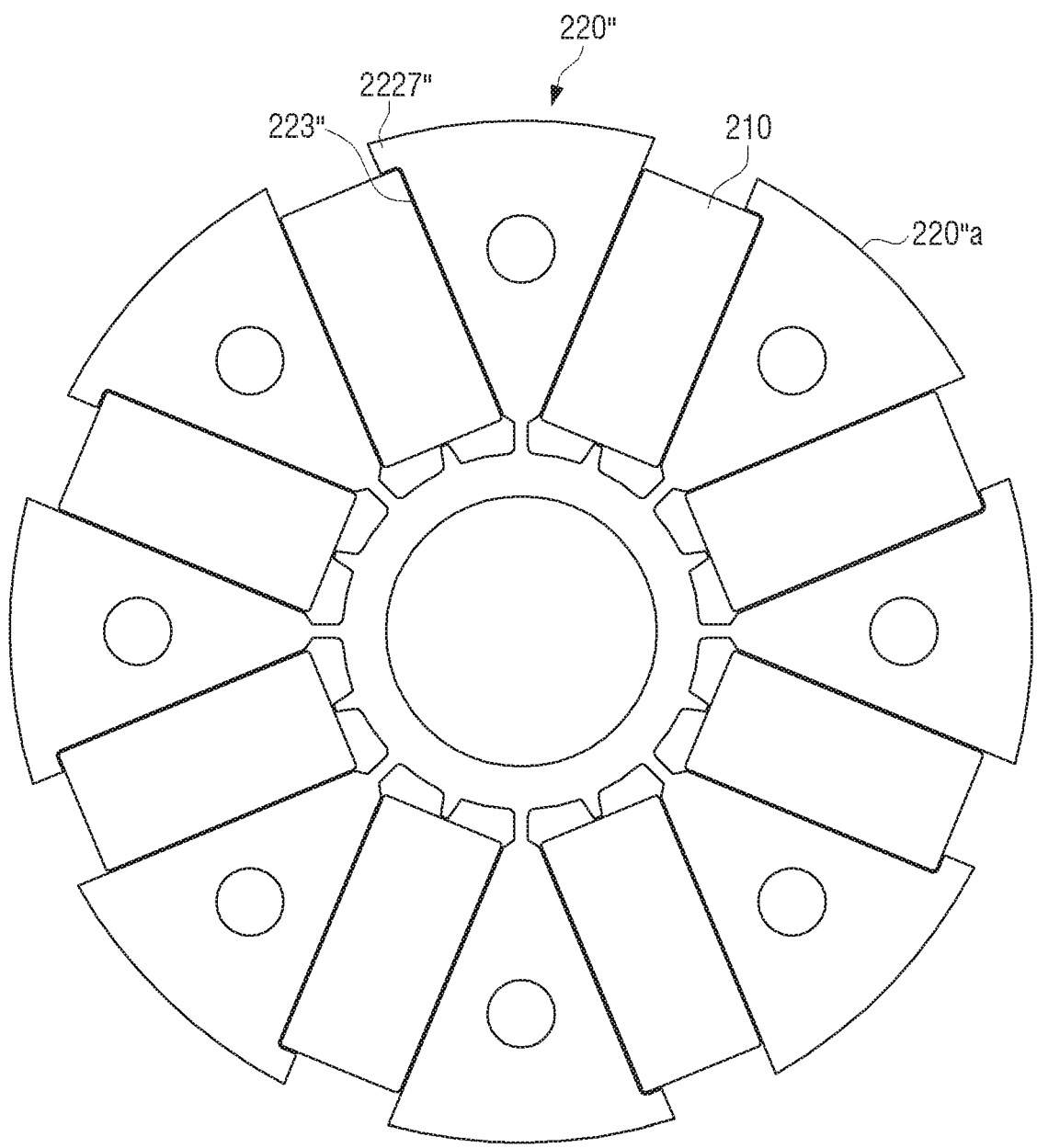
FIG. 12B is a view illustrating a second variation of a permanent magnet fixing core constituting a rotor of a motor according to an embodiment of the present disclosure.

FIG. 12A is a view illustrating a first variation of a permanent magnet fixing core constituting a rotor of a motor according to an embodiment of the present disclosure, and FIG. 12B is a view illustrating a second variation of a permanent magnet fixing core constituting a rotor of a motor according to an embodiment of the present disclosure.

Referring to FIG. 12A, a magnet fixing hole 223' of a permanent magnet fixing core 220' is provided with a single fixing protrusion 2227' in an outer end of the magnet fixing hole 223' in the radial direction from the center C of the rotor 200. The permanent magnet fixing core 220' is provided with the single fixing protrusion 2227' projecting from a side surface of the outer end of the magnet fixing hole 223' that is in fluid communication with an outer circumferential surface 220'a of the permanent magnet fixing core 220'. In FIG. 12A, the single fixing protrusion 2227' is provided on the left side surface of the magnet fixing hole 223', but embodiments are not limited to the left side surface. In the above-described permanent magnet fixing core 220, the pair of fixing protrusions 227 are formed on the outer end of the magnet fixing hole 223. However, the permanent magnet fixing core 220' according to the present embodiment is different from the above-described embodiment in that only a single fixing protrusion 2227' is formed on the outer end of the magnet fixing hole 223'.

Accordingly, since the permanent magnet 210 inserted into the magnet fixing hole 223' is fixed by the one fixing protrusion 227', even when the rotor 200 rotates at a high speed, the permanent magnet 210 is not extracted from the magnet fixing hole 223' by the centrifugal force. The size and shape of the fixing protrusion 2227' may be determined to prevent the permanent magnet 210 from being extracted from the magnet fixing hole 223' by the centrifugal force when the rotor 200 rotates at the maximum speed.

Referring to FIG. 12B, a single fixing protrusion 2227" is provided in a magnet fixing hole 223" of a permanent magnet fixing core 220" in substantially the same manner as the permanent magnet fixing core 220' according to the above-described embodiment. However, the direction in which the fixing protrusion 2227" is disposed is different. The fixing protrusion 2227' of the permanent magnet fixing core 220' as illustrated in FIG. 12A is provided on the left side surface of the outer end of the magnet fixing hole 223', but the fixing protrusion 2227" of the permanent magnet fixing core 220" as illustrated in FIG. 12B is provided on the right side surface of the outer end of the magnet fixing hole 223" that is in fluid communication with an outer circumferential surface 220"*a* of the permanent magnet fixing core 220".

In the permanent magnet fixing core 220" as illustrated in FIG. 12B, since the permanent magnet 210 inserted into the magnet fixing hole 223" is fixed by the one fixing protrusion 2227", even when the rotor 200 rotates at a high speed, the permanent magnet 210 is not extracted from the magnet fixing hole 223" by the centrifugal force. The size and shape of the fixing protrusion 2227" may be determined to prevent the permanent magnet 210 from being extracted from the magnet fixing hole 223" by the centrifugal force when the rotor 200 rotates at the maximum speed.

Hereinafter, a case in which the magnet receiving hole of the injection fixing core is provided with a single fixing groove will be described with reference to FIGS. 13A and 13B.

Figure 13A:
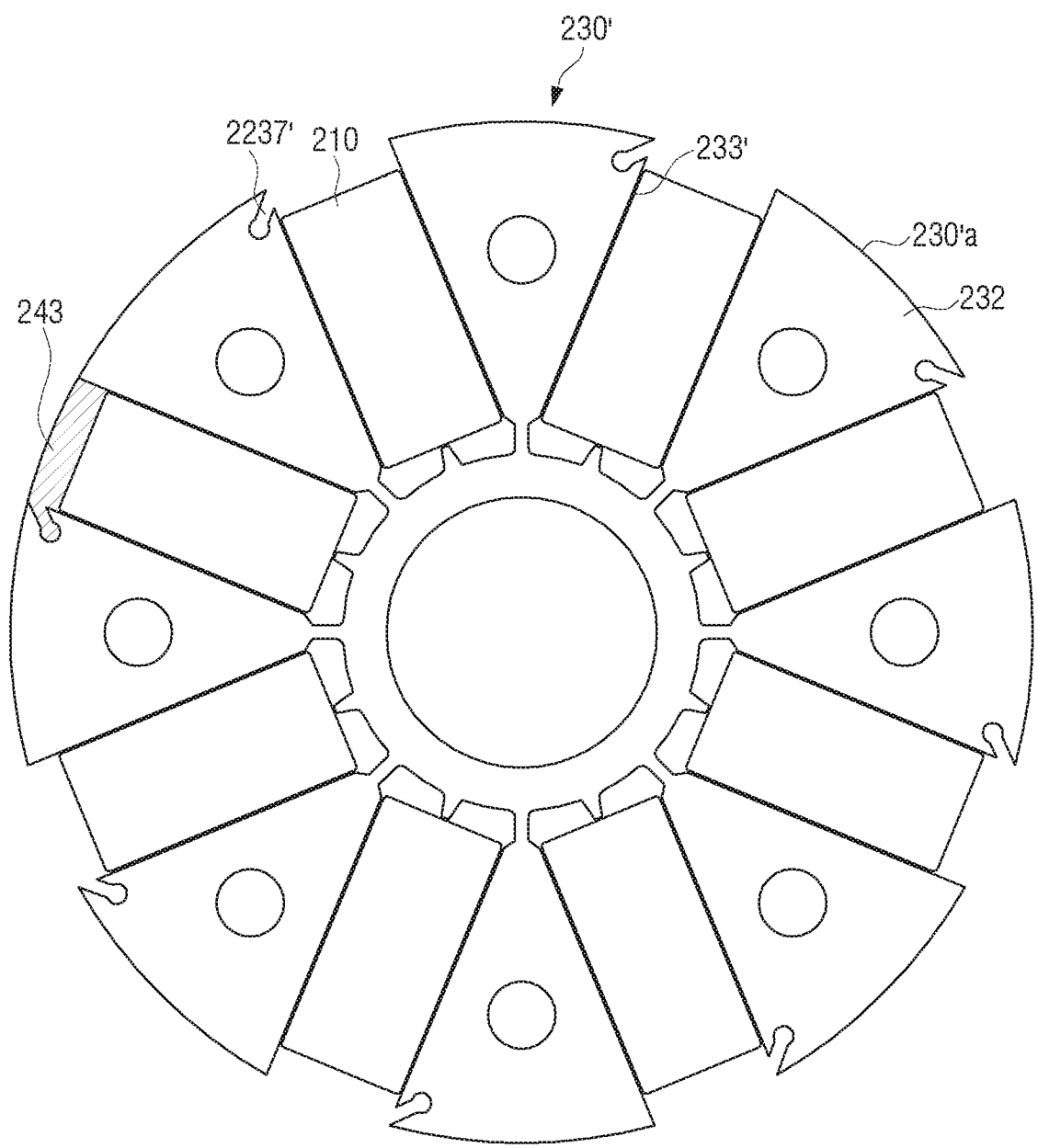
FIG. 13A is a view illustrating a first variation of an injection fixing core constituting a rotor of a motor according to an embodiment of the present disclosure.
Figure 13B:
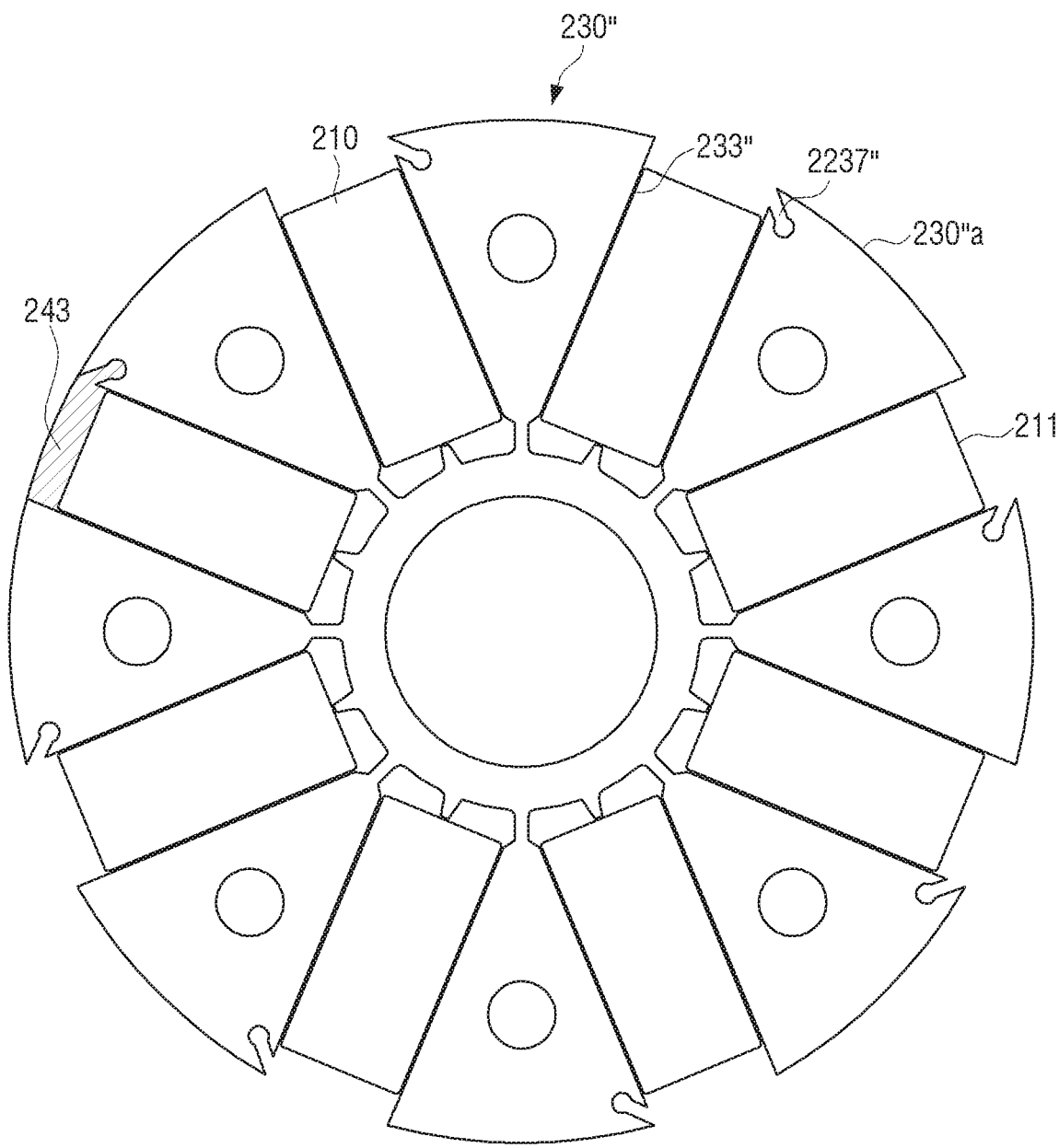
FIG. 13B is a view illustrating a second variation of an injection fixing core constituting a rotor of a motor according to an embodiment of the present disclosure.

FIG. 13A is a view illustrating a first variation of an injection fixing core constituting a rotor of a motor according to an embodiment of the present disclosure, and FIG. 13B is a view illustrating a second variation of an injection fixing core constituting a rotor of a motor according to an embodiment of the present disclosure.

Referring to FIG. 13A, a magnet receiving hole 233' of an injection fixing core 230' is provided with a single fixing groove 2237' in an outer end of the magnet receiving hole 233' in the radial direction from the center C of the rotor 200. The single fixing groove 2237' is formed to be inclined toward the inside of the core arm 232, and is provided in a side surface of the outer end of the magnet receiving hole 233' that is in fluid communication with the outer circumferential surface 230'*a* of the injection fixing core 230'. In FIG. 13A, the one fixing groove 2237' is provided on the left side surface of the magnet receiving hole 233', but embodiments are not limited to the left side surface. In the above-described injection fixing core 230, the pair of fixing grooves 237 are formed on the outer end of the magnet receiving hole 223. However, the injection fixing core 230' according to the present embodiment is different from the above-described embodiment in that only one fixing hole 2237' is formed on the outer end of the magnet receiving hole 233'.

Accordingly, since the connecting bar 243 of the injection ring 240 positioned in the outer end 211 of the permanent magnet 210 inserted into the magnet receiving hole 233' is fixed by the one fixing groove 2237', even when the rotor 200 rotates at a high speed, the connecting bar 243 cannot become separated from the permanent magnet 210 by the centrifugal force. The size and shape of the fixing groove 237' may be determined to prevent the connecting bar 243 of the injection ring 240 from becoming separated from the permanent magnet 210 by the centrifugal force when the rotor 200 rotates at the maximum speed.

Referring to FIG. 13B, a single fixing groove 2237" is provided in a magnet receiving hole 233" of an injection fixing core 230" in substantially the same manner as the injection fixing core 230' according to the above-described embodiment. However, the direction in which the fixing groove 2237" is disposed is different. The fixing groove 2237' of the injection fixing core 230' as illustrated in FIG. 13A is provided on the left side surface of the outer end of the magnet receiving hole 233', but the fixing groove 2237" of the injection fixing core 230" as illustrated in FIG. 13B is provided on the right side surface of the outer end of the magnet receiving hole 233" that is in fluid communication with the outer circumferential surface 230"*a* of the injection fixing core 230".

In the injection fixing core 230" as illustrated in FIG. 13B, since the connecting bar 243 of the injection ring 240 covering the outer end 211 of the permanent magnet 210 inserted into the magnet receiving hole 233" is fixed by the one fixing groove 2237", even when the rotor 200 rotates at a high speed, the connecting bar 243 of the injection ring 240 cannot become separated from the permanent magnet 210 by the centrifugal force. The size and shape of the fixing groove 2237" may be determined to prevent the connecting bar 243 of the injection ring 240 from becoming separated from the permanent magnet 210 by the centrifugal force when the rotor 200 rotates at the maximum speed.

Hereinafter, a method of forming a rotor by stacking permanent magnet fixing cores having a single fixing protrusion and injection fixing cores having a single fixing groove will be described with reference to FIGS. 14 and 15.

In the case of the permanent magnet fixing cores and the injection fixing cores as illustrated in FIGS. 12A, 12B, 13A, and 13B, the rotor may be formed by stacking alternately the permanent magnet fixing cores and the injection fixing cores in substantially the same manner as the above-described embodiments. However, in the present embodiment, since the permanent magnet fixing core is provided with a single fixing protrusion, and the injection fixing core is provided with a single fixing groove, the permanent magnet fixing cores and the injection fixing cores may be stacked so that the direction of the fixing protrusion and the direction of the fixing groove are different from each other.

Figure 14:
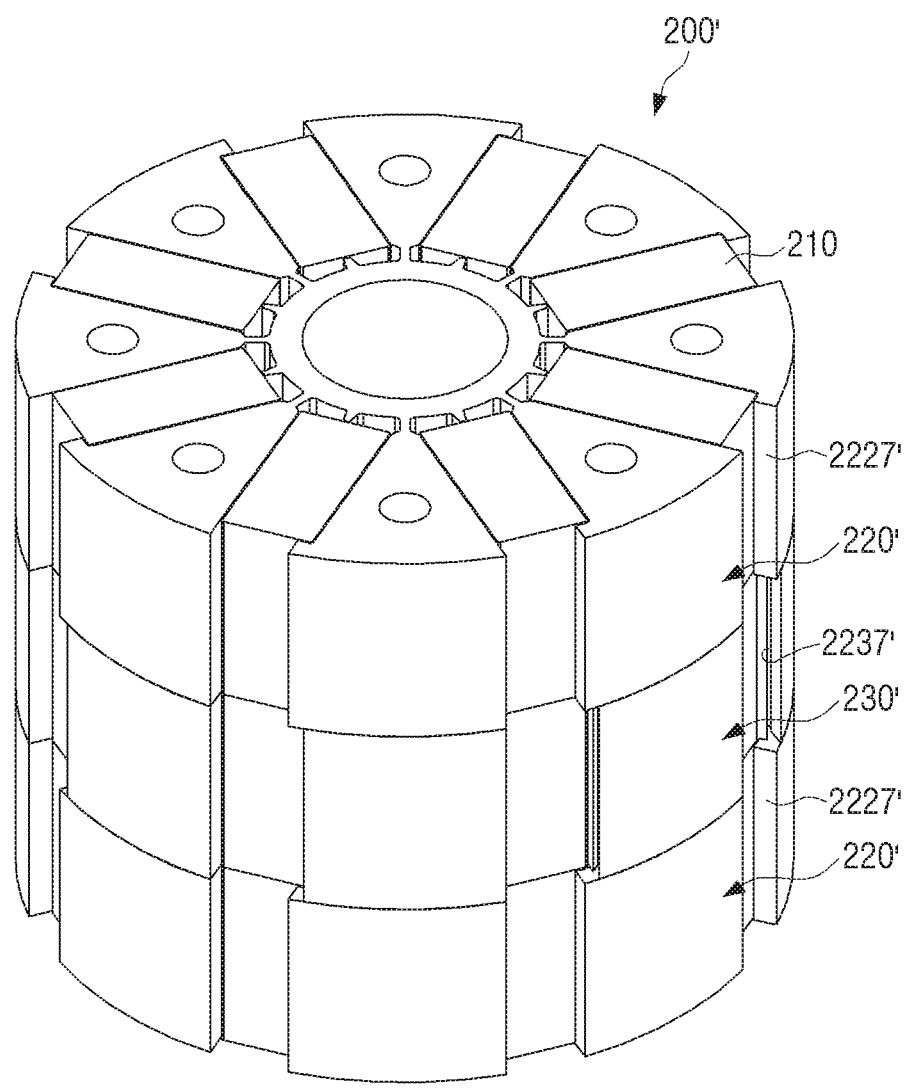
FIG. 14 is a perspective view illustrating an example of a stacked structure of permanent magnet fixing cores and injection fixing cores constituting a rotor of a motor according to an embodiment of the present disclosure.

FIG. 14 is a perspective view illustrating an example of a stacked structure of permanent magnet fixing cores and an injection fixing core constituting a rotor of a motor according to an embodiment of the present disclosure.

Referring to FIG. 14, a rotor 200' includes two permanent magnet fixing cores 220' and one injection fixing core 230'. The two permanent magnet fixing cores 220' are assembled so that the fixing protrusions 2227' are positioned in the same direction. In the rotor 200' as illustrated in FIG. 14, the fixing protrusions 2227' are stacked to be positioned in the right side surface of the magnet receiving hole 233'. The fixing groove 2237' of the injection fixing core 230' is also stacked to be positioned in the same direction as the fixing protrusions 2227'.

The rotor 200' in which the fixing protrusions 2227' of the permanent magnet fixing cores 220' and the fixing groove 2237' of the injection fixing core 230' are positioned in the same direction as described above may be applied to a particular operation or motor, such as a motor that is configured to rotate only in one direction.

FIG. 14 illustrates the case in which the fixing protrusions 2227' of the two permanent magnet fixing cores 220' and the fixing groove 2237' of the injection fixing core 230' are stacked to be positioned in the right side of the magnet receiving hole 233'; however, the opposite case is also possible. For example, the fixing protrusions of the two permanent magnet fixing cores and the fixing groove of the injection fixing core may be stacked to be positioned in the left side of the magnet receiving hole.

In order to use the rotor in a motor that is to be used for, or is capable of rotating in a two-way direction, it is necessary for the fixing protrusions of the permanent magnet fixing cores and the fixing grooves of the injection fixing cores to be stacked alternately positioned in opposite sides of the magnet receiving hole.

Figure 15:
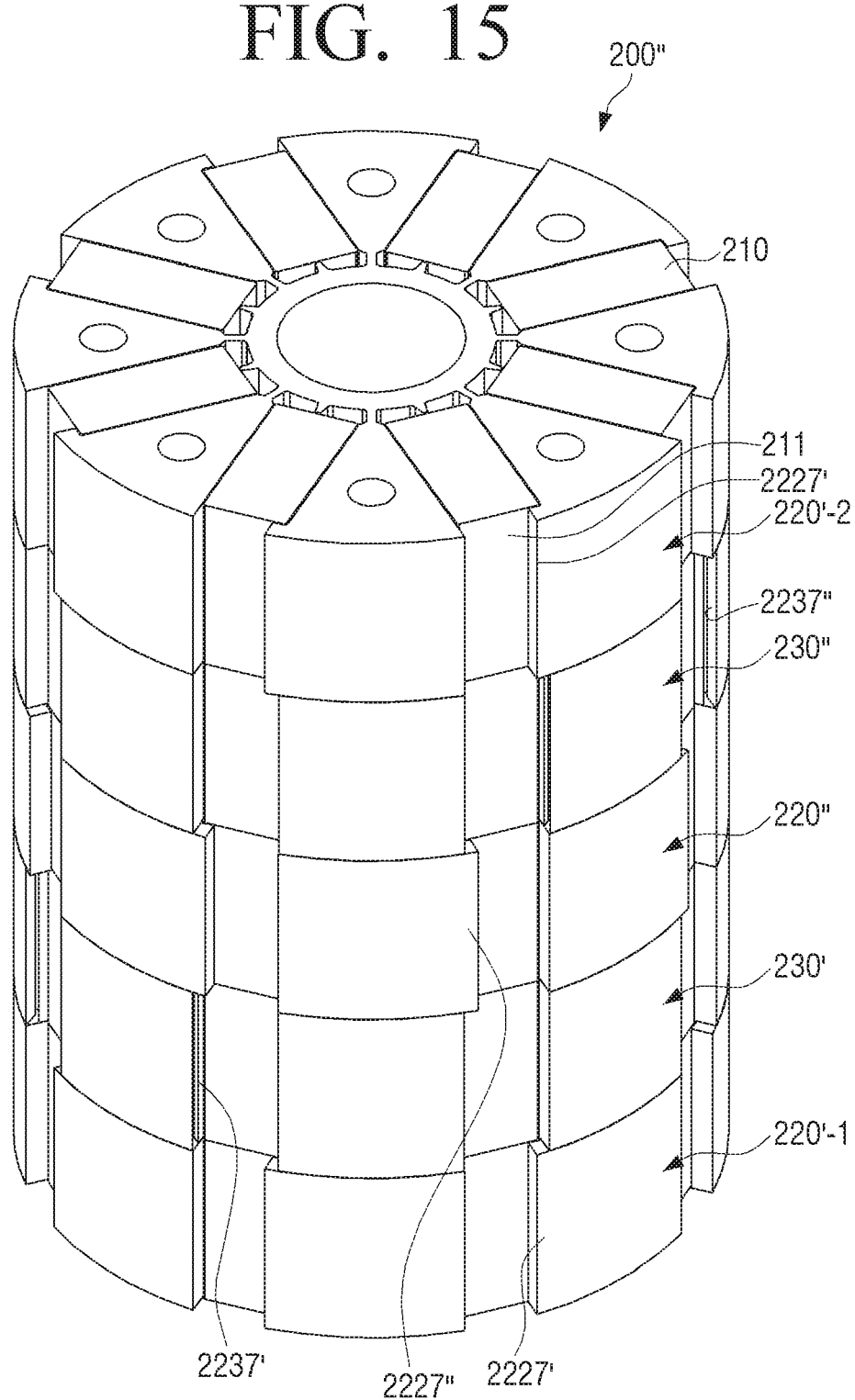
FIG. 15 is a perspective view illustrating another example of a stacked structure of permanent magnet fixing cores and injection fixing cores constituting a rotor of a motor according to an embodiment of the present disclosure.

FIG. 15 is a perspective view illustrating another example of a stacked structure of permanent magnet fixing cores and injection fixing cores constituting a rotor of a motor according to an embodiment of the present disclosure.

Referring to FIG. 15, a rotor 200" includes three permanent magnet fixing cores 220" and two injection fixing cores 230". Fixing protrusions 2227" of two adjacent permanent magnet fixing cores 220" are stacked to be positioned in the side opposite to each other.

In detail, in the rotor 200" as illustrated in FIG. 15, the fixing protrusion 2227' of the first permanent magnet fixing core 220'-1 positioned at the bottom is located in the right side surface of the magnet fixing hole, and the fixing protrusion 2227" of the second permanent magnet fixing core 220" adjacent to the first permanent magnet fixing core 220'-1 is stacked to be located in the left side surface of the magnet fixing hole. The fixing protrusion 2227' of the third permanent magnet fixing core 220'-2 adjacent to the second permanent magnet fixing core 220" is stacked to be located in the right side surface of the magnet fixing hole. Accordingly, because the fixing protrusions 2227', 2227", and 2227' of the first to third permanent magnet fixing cores 220'-1, 220", and 220'-2 fix the outer end 211 of the permanent magnet 210 in the order of right-left-right, the permanent magnet 210 may be prevented from being extracted from the magnet fixing hole even when the rotor 200" rotates in both directions.

The first injection fixing core 230' is provided between the first and second permanent magnet fixing cores 220'-1 and 220", and the second injection fixing core 230" is provided between the second and third permanent magnet fixing cores 220" and 220'-2. The first and second injection fixing cores 230' and 230" are also stacked so that the fixing grooves 2237' and 2237" are positioned in the side opposite to each other. In FIG. 15, the fixing groove 2237' of the first injection fixing core 230' is stacked to be positioned in the left side of the magnet receiving hole, and the fixing groove 2237" of the second injection fixing core 230" is stacked to be positioned in the right side of the magnet receiving hole. Accordingly, because the fixing grooves 2237' and 2237" of the first and second injection fixing cores 230' and 230" fix the connecting bar 243 (not shown) of the injection ring 240 on the left and right sides, the connecting bars 243 of the injection ring 240 may be prevented from becoming separated from the permanent magnet 210 even when the rotor 200" rotates in both directions.

In FIG. 15, the rotor is illustrated and described including three permanent magnet fixing cores provided with one fixing protrusion and two injection fixing cores provided with one fixing groove; however, this is only one example. The number of the permanent magnet fixing cores and the injection fixing cores is not limited thereto. The number of the permanent magnet fixing cores and the injection fixing cores is not limited as long as fixing protrusions of two adjacent permanent magnet fixing cores are stacked to be arranged on the opposite side to each other, and the fixing grooves of the two adjacent injection fixing cores are stacked to be arranged on the opposite side to each other.

The rotor in which the fixing protrusions of the two adjacent permanent magnet fixing cores are stacked to be positioned on the opposite side to each other and the fixing grooves of the two adjacent injection fixing cores are stacked to be positioned on the opposite side to each other may be used in a motor that is to be used for, or is capable of rotating in both directions.

In the above description, the fixing protrusions for fixing the permanent magnet and the fixing grooves for fixing the connecting bars of the injection ring are provided in the permanent magnet fixing core and the injection fixing core that are formed separately. However, the fixing protrusion and the fixing groove may be formed on both sides of the outer end of the magnet fixing hole. Hereinafter, a mixed fixing core having a single magnet fixing hole provided with a fixing protrusion and a fixing groove will be described.

Figure 16A:
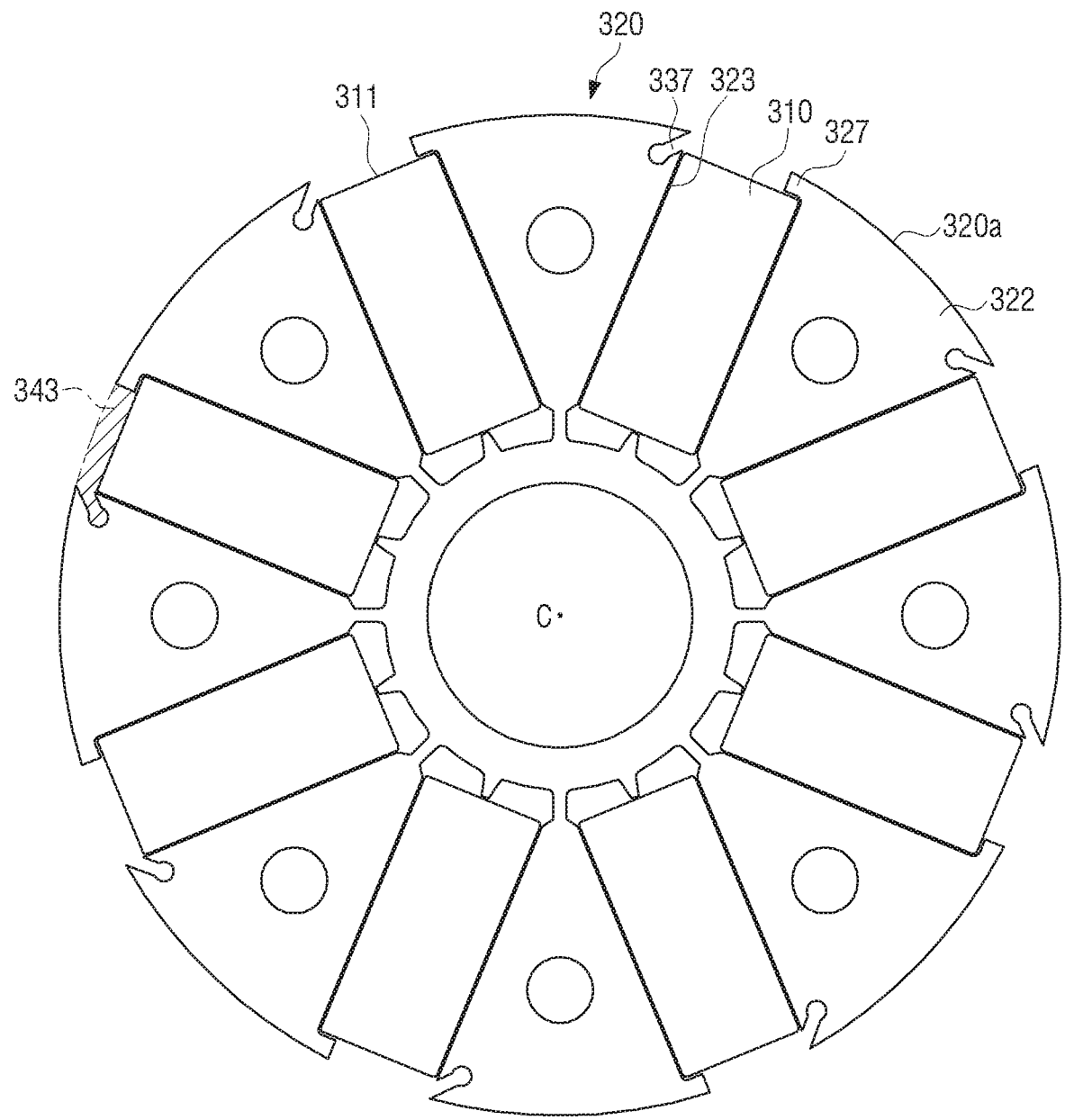
FIG. 16A is a view illustrating an example of a mixed fixing core constituting a rotor of a motor according to an embodiment of the present disclosure.
Figure 16B:
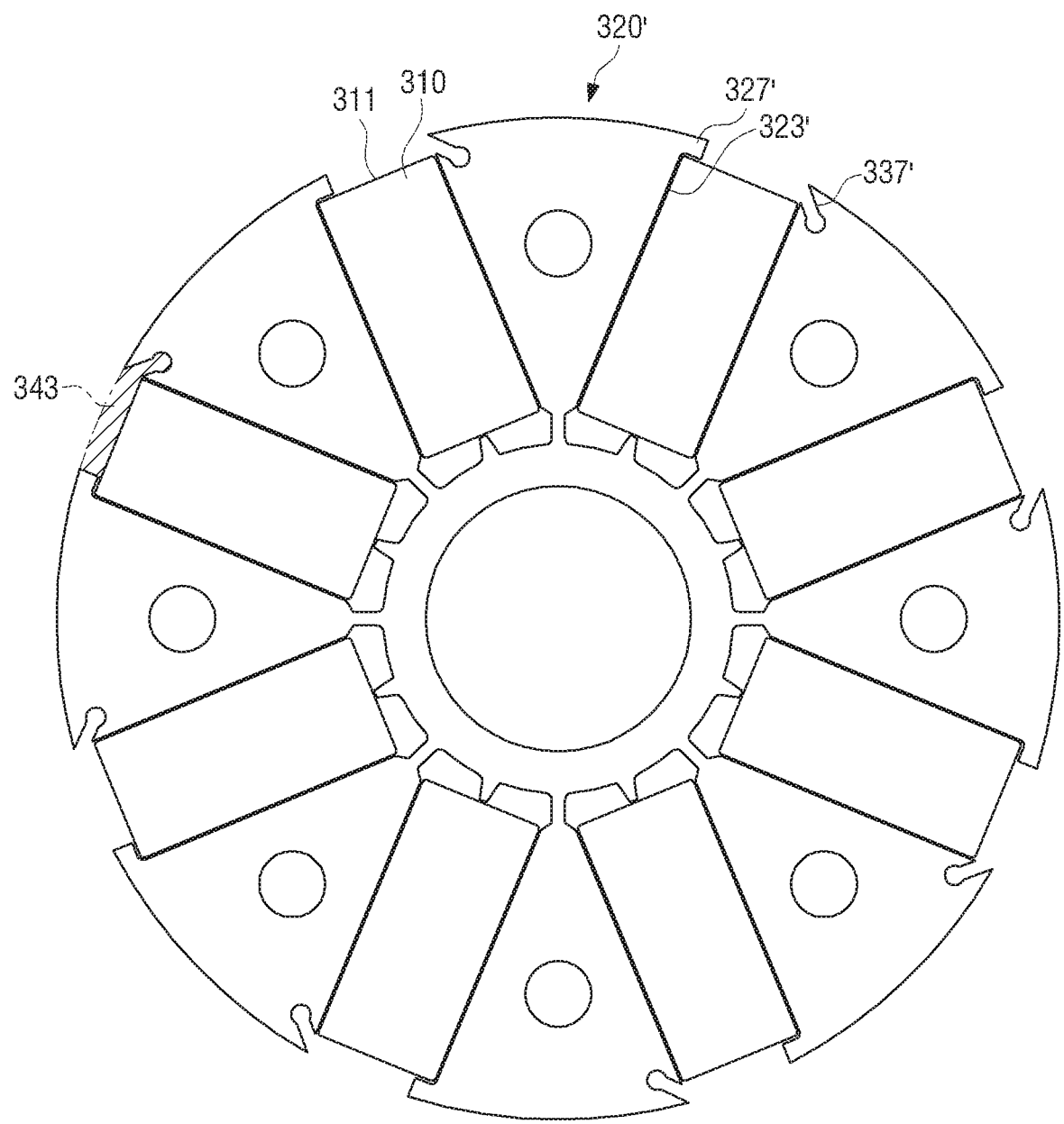
FIG. 16B is a view illustrating another example of a mixed fixing core constituting a rotor of a motor according to an embodiment of the present disclosure.

FIG. 16A is a view illustrating an example of a mixed fixing core constituting a rotor of a motor according to an embodiment of the present disclosure, and FIG. 16B is a view illustrating another example of a mixed fixing core constituting a rotor of a motor according to an embodiment of the present disclosure.

Referring to FIG. 16A, a magnet fixing hole 323 of a mixed fixing core 320 to receive a permanent magnet 310 includes a fixing protrusion 327 that is provided at one side of the outer end of the magnet fixing hole 323 in the radial direction from the center C of the mixed fixing core 320, and a fixing groove 337 that is provided at the opposite side of the outer end of the magnet fixing hole 323. In detail, the fixing protrusion 327 to fix the permanent magnet 310 projects from a side surface of the outer end of the magnet fixing hole 323 which is in fluid communication with the outer circumferential surface 320a of the mixed fixing core 320, and the fixing groove 337 to fix the connecting bar of the injection ring is provided on the opposite side surface of the outer end of the magnet fixing hole 323 toward the inside of a core arm 322 of the mixed fixing core 320. The outer end of the magnet fixing hole 323 is provided with both the fixing protrusion 327 and the fixing groove 337 formed to face each other. In FIG. 16A, the fixing protrusion 327 is provided on the right side surface of the magnet fixing hole 323, and the fixing groove 337 is provided on the left side surface of the magnet fixing hole 323, but embodiments are not limited thereto.

Accordingly, since the permanent magnet 310 inserted into the magnet fixing hole 323 of the mixed fixing core 320 is fixed by the fixing protrusion 327, even when the rotor rotates at a high speed, the permanent magnet 310 cannot become extracted from the magnet fixing hole 323 by the centrifugal force. Also, since the connecting bar 343 of the injection ring positioned on the outer end 311 of the permanent magnet 310 is fixed by the fixing groove 337, even when the rotor rotates at a high speed, the connecting bar 343 of the injection ring cannot become separated from the permanent magnet 310 by the centrifugal force. The size and shape of each of the fixing protrusions 327 and the fixing grooves 337 may be determined to prevent the permanent magnet 310 and the connecting bar 343 of the injection ring from becoming separated from the rotor due to the centrifugal force.

The other structure of the mixed fixing core 320 is substantially the same as that of the above-described permanent magnet fixing core 220; therefore, a detailed description thereof is omitted.

Referring to FIG. 16B, the outer end of a magnet fixing hole 323' of a mixed fixing core 320' is provided with one fixing protrusion 327' and one fixing groove 337' that are formed to face each other in substantially the same manner as the above-described embodiment. However, the disposed direction of the fixing protrusion 327' and the fixing groove 337' is different. In the mixed fixing core 320 as illustrated in FIG. 16A, the fixing protrusion 327 and the fixing groove 337 are provided on the right side surface and the left side surface of the outer end of the magnet fixing hole 323, respectively. However, in the mixed fixing core 320' as illustrated in FIG. 16B, the fixing protrusion 327' and the fixing groove 337' are provided on the left side surface and the right side surface of the outer end of the magnet fixing hole 323', respectively.

Hereinafter, a method of forming a rotor by stacking the mixed fixing cores having fixing protrusion and fixing groove facing each other will be described with reference to FIGS. 17 and 18.

In order to form a rotor, the mixed fixing cores as illustrated in FIGS. 16A and 16B may be stacked in two ways depending on the arrangement of the fixing protrusion and the fixing groove.

Figure 17:
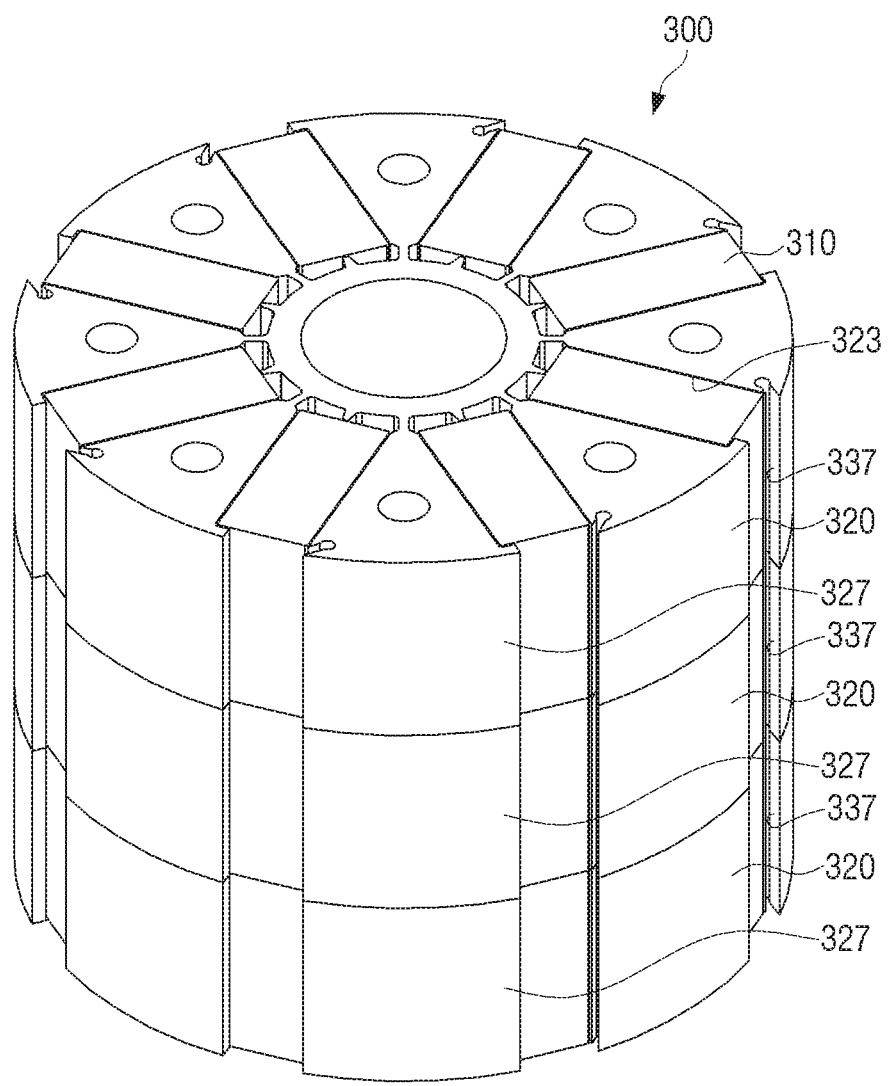
FIG. 17 is a perspective view illustrating an example of a stacked structure of mixed fixing cores constituting a rotor of a motor according to an embodiment of the present disclosure.

FIG. 17 is a perspective view illustrating an example of a stacked structure of mixed fixing cores constituting a rotor of a motor according to an embodiment of the present disclosure.

Referring to FIG. 17, a rotor 300 includes three mixed fixing cores 320. The three mixed fixing cores 320 are assembled so that the fixing protrusions 327 and the fixing grooves 337 are positioned in the same direction. In the rotor 300 as illustrated in FIG. 17, the three mixed fixing cores 320 are stacked so that the fixing protrusions 327 are positioned on the left side surface of the magnet fixing hole 323, and the fixing grooves 337 are positioned on the right side surface of the magnet fixing hole 323. The rotor 300 in which the fixing protrusions 327 and the fixing grooves 337 of the mixed fixing cores 320 are positioned in the same side may be used in a motor that is to be used for, or is capable of rotating only in one direction.

Figure 18:
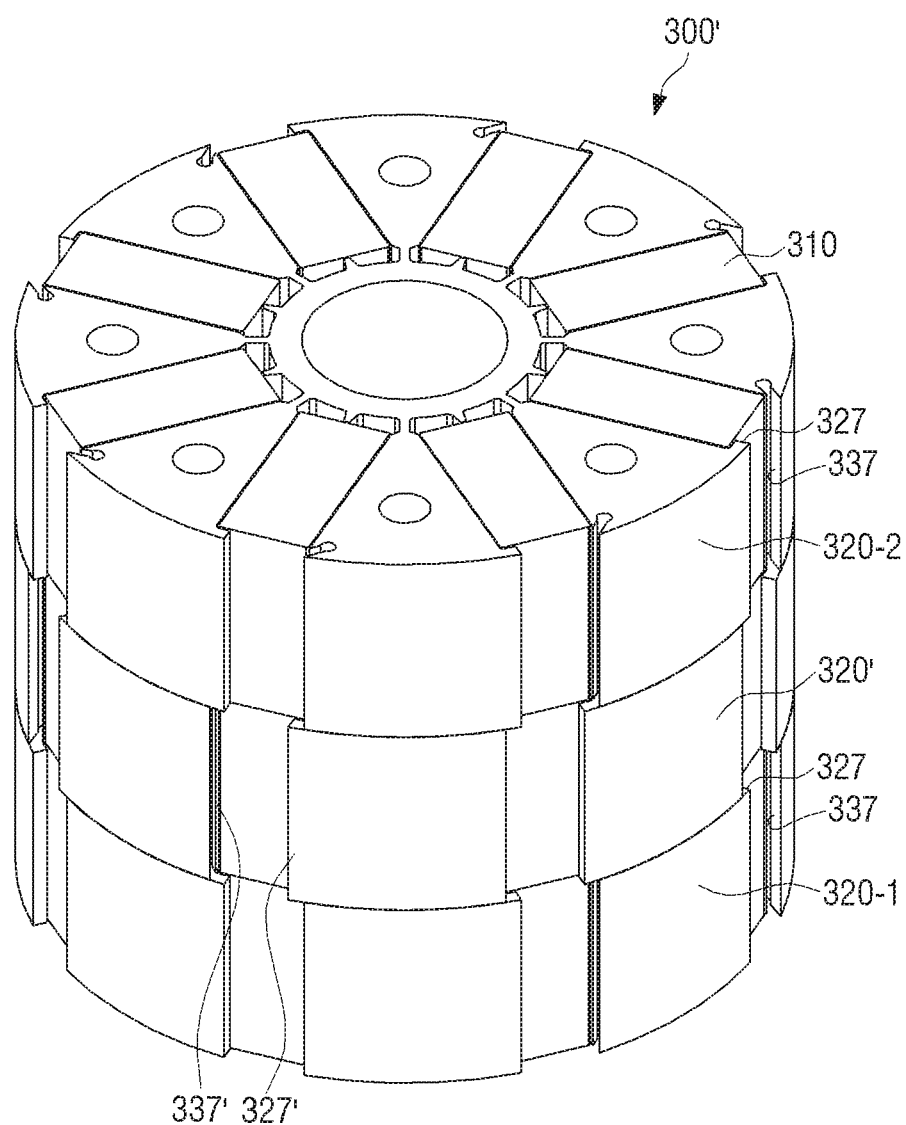
FIG. 18 is a perspective view illustrating another example of a stacked structure of mixed fixing cores constituting a rotor of a motor according to an embodiment of the present disclosure.

FIG. 18 is a perspective view illustrating another example of a stacked structure of mixed fixing cores constituting a rotor of a motor according to an embodiment of the present disclosure.

Referring to FIG. 18, a rotor 300' includes three mixed fixing cores 320-1, 320', and 320-2. The three mixed fixing cores 320-1, 320', and 320-2 are assembled so that the fixing protrusions 327 and fixing grooves 337 of two adjacent mixed fixing cores are positioned in the opposite side to each other.

In the rotor 300' as illustrated in FIG. 18, the first mixed fixing core 320-1 positioned at the bottom is stacked so that the fixing protrusion 327 is positioned in the left side surface of the magnet fixing hole, and the fixing groove 337 is positioned in the right side surface of the magnet fixing hole. The second mixed fixing core 320' positioned on the top of the first mixed fixing core 320-1 is stacked so that the fixing protrusion 327' is positioned in the right side surface of the magnet fixing hole, and the fixing groove 337' is positioned in the left side surface of the magnet fixing hole. Also, the third mixed fixing core 320-2 positioned on the top of the second mixed fixing core 320' is stacked so that the fixing protrusion 327 is positioned in the left side surface of the magnet fixing hole, and the fixing groove 337 is positioned in the right side surface of the magnet fixing hole. Accordingly, the two adjacent mixed fixing cores are stacked so that fixing protrusions 327 and 327' and fixing grooves 337 and 337' are positioned in the opposite side to each other.

Accordingly, because the fixing protrusions 327, 327', and 327 of the three mixed fixing cores 320-1, 320', and 320-2 fix the outer end 311 of the permanent magnet 310 in the order of left-right-left, even when the rotor 300' rotates in both directions, the permanent magnet 310 may be prevented from being extracted from the magnet fixing hole 323. Also, because the fixing grooves 337, 337', and 337 of the three mixed fixing cores 320-1, 320', and 320-2 fix the connecting bar 343 (not shown) of the injection ring located on the outer end 311 of the permanent magnet 310 on the right-left-right sides, even when the rotor 300' rotates in both directions, the connecting bar 343 of the injection ring may be prevented from becoming separated from the permanent magnet 310.

The rotor in which the fixing protrusions and the fixing grooves of the two adjacent mixed fixing cores are stacked to be positioned opposite to each other may be used in a motor that is to be used for, or is capable of rotating in both directions.

In FIGS. 17 and 18, the rotor using three mixed fixing cores is described; however, this is only one example. The number of the mixed fixing cores is not limited thereto.

With the rotor of the motor according to an embodiment of the present disclosure having the above-described structure, because only the fixing protrusion or the fixing groove exists between the outer circumferential surface of the rotor and the outer end of the permanent magnet, the distance between the outer circumferential surface of the rotor and the outer end of the permanent magnet may be reduced more than the rotor of the related art in which the fixing protrusion and the fixing groove are provided in a superposed manner between the outer circumferential surface of the rotor and the outer end of the permanent magnet. Accordingly, when using a rotor of the same size, the size of the permanent magnet may be increased to the extent the space of the fixing protrusion or the fixing groove is reduced. Therefore, the performance of the motor according to an embodiment of the present disclosure may be improved in comparison to the motor of the related art.

Hereinafter, test results comparing the torque of the motor according to an embodiment of the present disclosure and the torque of the motor of the related art will be described.

A motor of the related art and a motor according to an embodiment of the present disclosure were tested in a state in which conditions were substantially the same, and only the rotor was varied.

Figure 19A:
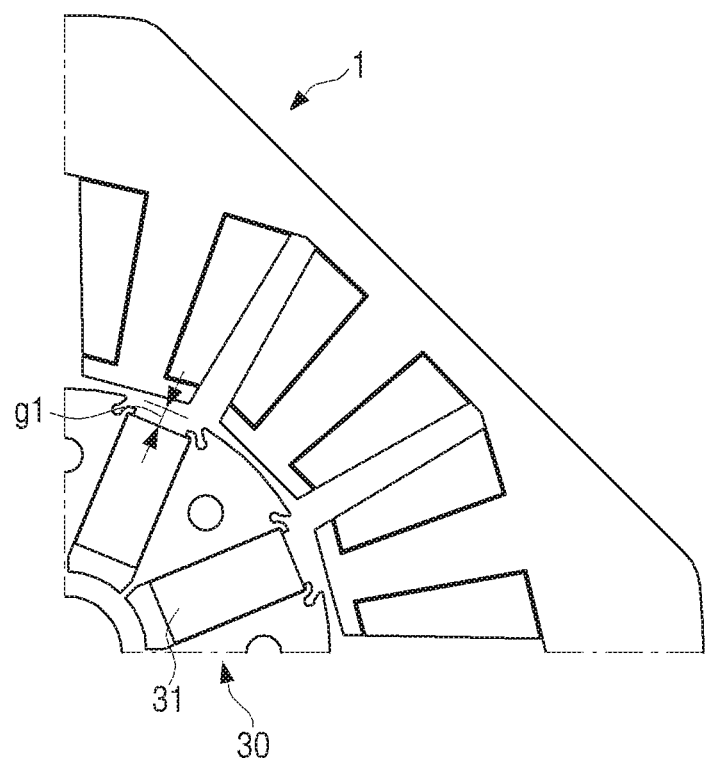
FIG. 19A is a partial view schematically illustrating a structure of a rotor of a motor of the related art according to an embodiment of the present disclosure.
Figure 19B:
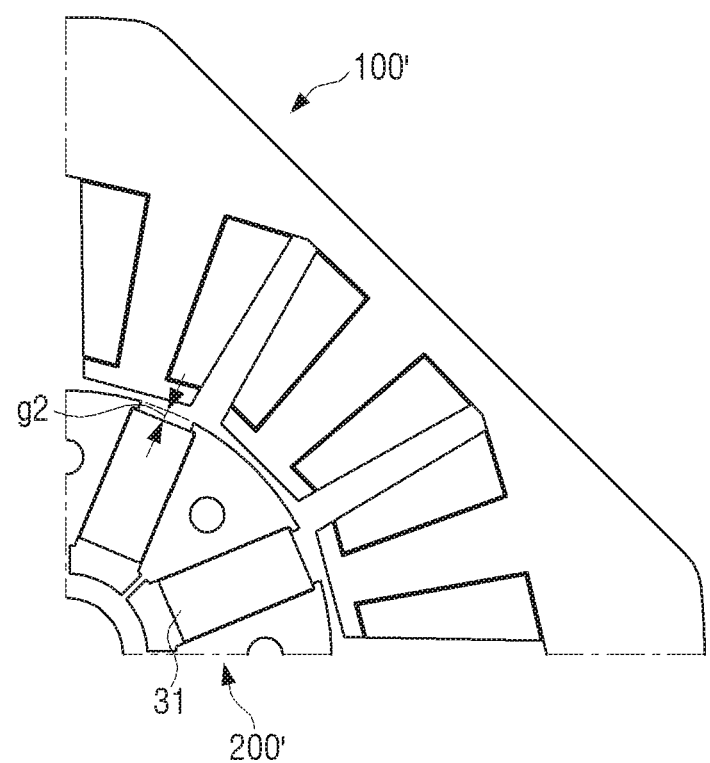
FIG. 19B is a partial view illustrating a case in which permanent magnets of a motor of the related art are applied to a core of a motor according to an embodiment of the present disclosure.
Figure 19C:
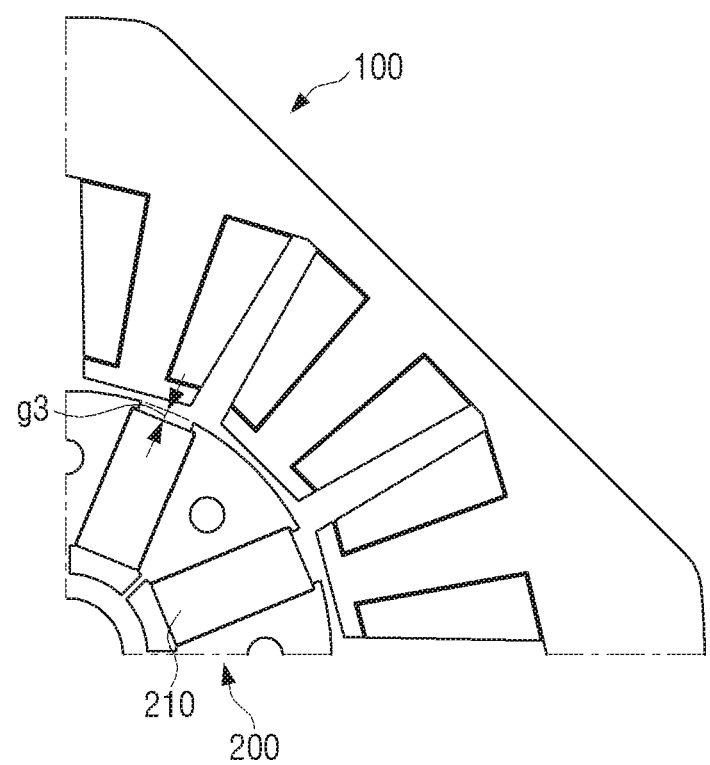
FIG. 19C is a partial view schematically illustrating a structure of a rotor of a motor according to an embodiment of the present disclosure.

FIGS. 19A, 19B, and 19C are partial views illustrating a structure of a tested motor according to an embodiment of the present disclosure.

Figure 1:
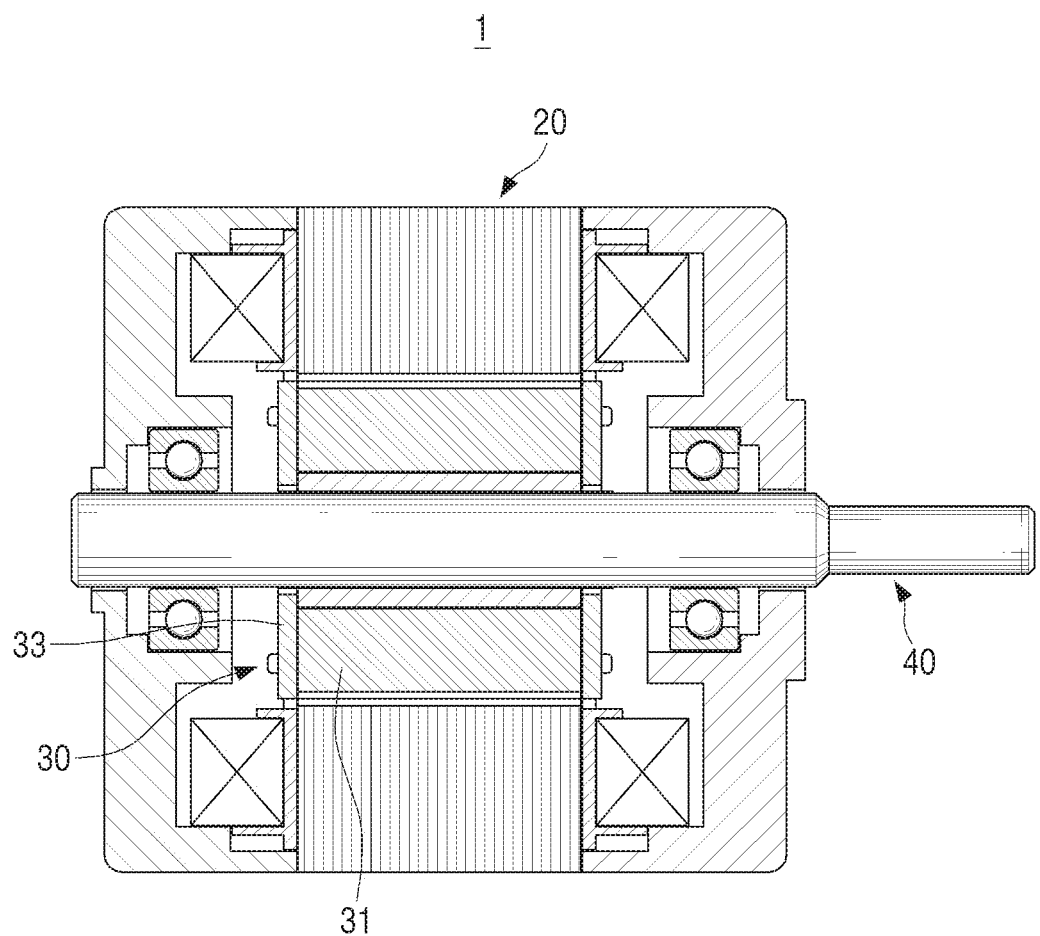
FIG. 1 is a cross-sectional view illustrating a spoke-type permanent magnet motor taken along a motor shaft thereof according to the related art.
Figure 2A:
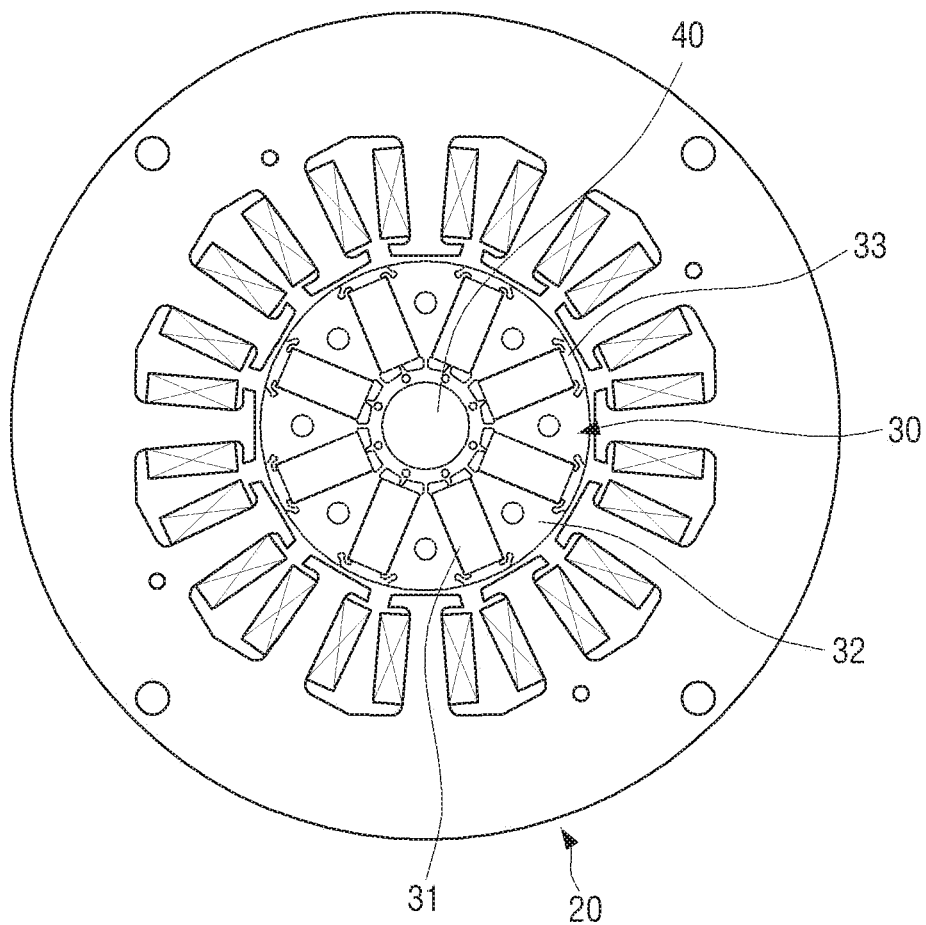
FIG. 2A is a cross-sectional view illustrating a spoke-type permanent magnet motor taken along a direction perpendicular to a motor shaft thereof according to the related art.
Figure 2B:
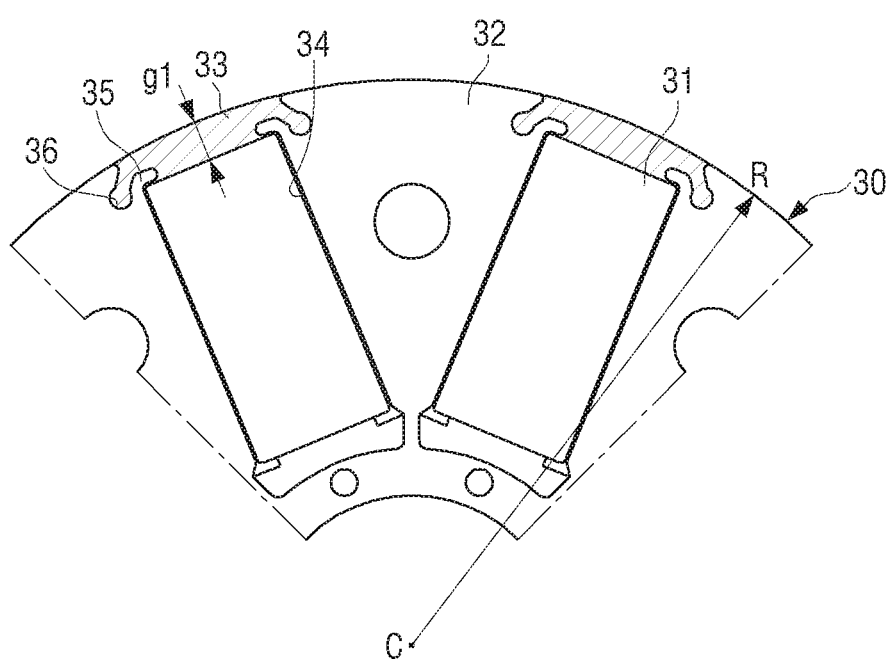
FIG. 2B is an enlarged partial view illustrating a portion of a rotor of a spoke-type permanent magnet motor according to the related art.

FIG. 19A shows a motor 1 according to the related art. The rotor 30 is the same structure as the rotor as illustrated in FIG. 2B. The distance g1 between the outer circumferential surface of the rotor 30 and the outer end of the permanent magnet 31 is approximately 2.5 mm.

FIG. 19B shows a motor 100' in which the permanent magnets 31 of the motor of the related art are applied to a rotor 200' according to an embodiment of the present disclosure. The distance g2 between the outer circumferential surface of the rotor 200' and the outer end of the permanent magnet 31 is approximately 1 mm. Also, the material and size of the permanent magnet 31 are the same as those of the motor 1 of the related art as illustrated in FIG. 19A.

FIG. 19C shows a motor 100 according to an embodiment of the present disclosure, and the structure of a rotor 200 is different from that of the motor 1 according to the related art. In detail, the distance g3 between the outer circumferential surface of the rotor 200 and the outer end of a permanent magnet 210 is approximately 1 mm. Also, the size of the permanent magnet 210 is larger than the permanent magnet 31 of the related art as illustrated in FIG. 19A. In the present disclosure, the size of the permanent magnet 210 is increased by about 8.9%.

Results of comparing torques of the three motors as described above are illustrated in FIG. 20.

Figure 20:
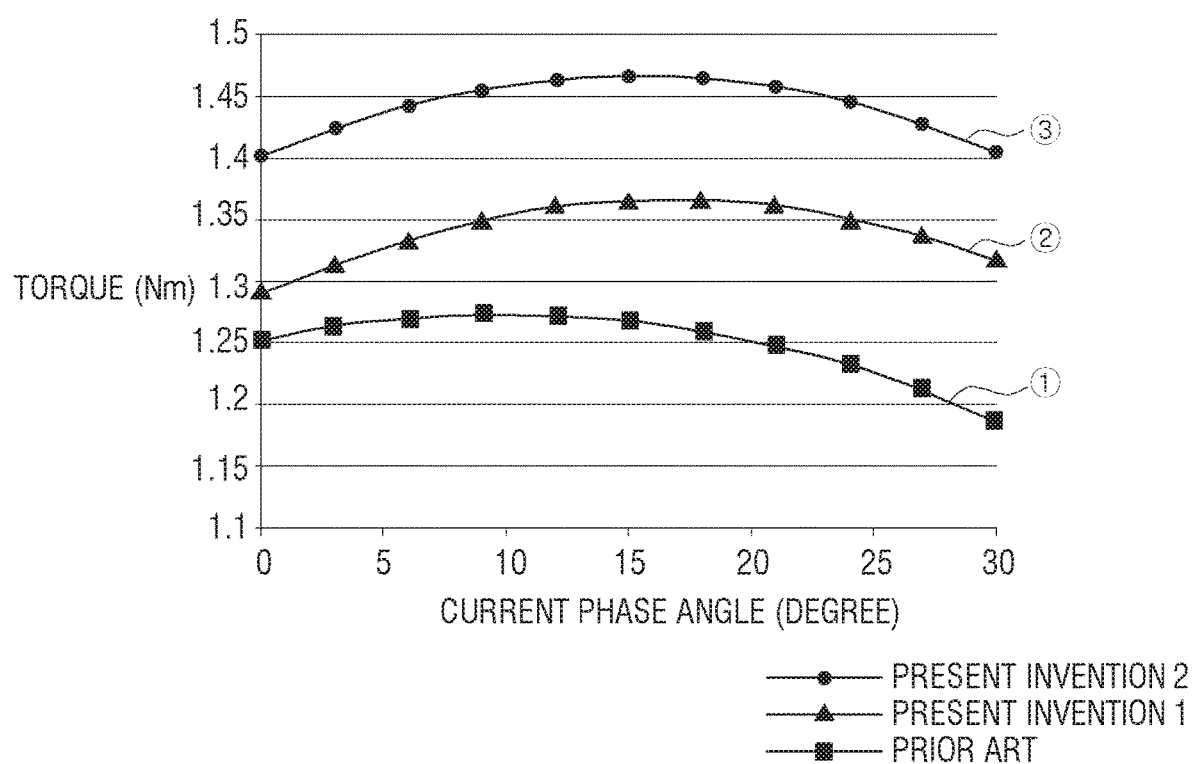
FIG. 20 is a graph illustrating a maximum output torque of a motor of the related art and a motor according to an embodiment of the present disclosure.

FIG. 20 is a graph illustrating a maximum output torque of a motor of the related art and a motor according to an embodiment of the present disclosure.

Referring to FIG. 20, a curved line b represents torque of the motor 1 of the related art as illustrated in FIG. 19A. A curved line 2 represents torque of the motor 100' in which permanent magnets of the motor of the related art are used in a rotor structure according to an embodiment of the present disclosure. A curved line represents torque of the motor 100 according to an embodiment of the present disclosure.

Referring to FIG. 20, it can be seen that in the entire range of the current phase angles, the torque of the motor 100 according to an embodiment of the present disclosure is the largest, and next the torque of the motor 100' in which permanent magnets of the motor of the related art are used in the rotor structure according to an embodiment of the present disclosure is large.

Compared to the maximum torque at the same current, the torque of the motor 100 according to an embodiment of the present disclosure is increased by about 15.2% than that of the motor 1 of the related art, and the torque of the motor 100' in which the permanent magnets of the motor of the related art are applied to the rotor of the motor according to an embodiment of the present disclosure is increased by about 7.3% than that of the motor 1 of the related art.

Also, since the current phase angle in which the motor exerts the maximum torque is increased from about 10 degrees or so to about 20 degrees or so, the shape of the rotor according to an embodiment of the present disclosure may be advantageous to use the reluctance torque.

Also, the rotor according to an embodiment of the present disclosure has a mechanical safety factor of the same level as the motor of the related art as confirmed by the computer simulation results for the stress applied to the rotor when the motor according to an embodiment of the present disclosure rotates at a high speed.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. A motor comprising:
a stator;
a rotor rotatably disposed in the stator; and
a motor shaft provided in the rotor to rotate integrally with the rotor,
wherein the rotor comprises:
at least one permanent magnet fixing core,
at least one injection fixing core alternately stacked with the at least one permanent magnet fixing core in a direction of the motor shaft,
a plurality of permanent magnets inserted at a predetermined interval in the at least one permanent magnet fixing core and the at least one injection fixing core, and
an injection ring formed to cover the at least one permanent magnet fixing core, the at least one injection fixing core, and the plurality of permanent magnets,
wherein the at least one permanent magnet fixing core is configured to prevent the plurality of permanent magnets from becoming separated from the rotor by a centrifugal force,
wherein the at least one injection fixing core is configured to prevent the injection ring from becoming separated from the rotor by the centrifugal force,
wherein the at least one injection fixing core does not radially overlap the plurality of permanent magnets,
wherein the at least one injection fixing core comprises a fixing groove inclined at a certain angle with respect to a magnet receiving hole toward an inside of a core arm from an outer circumferential surface of the at least one injection fixing core, and
wherein the at least one injection fixing core does not include a protrusion for fixing a permanent magnet.

2. The motor of claim 1,
wherein the at least one permanent magnet fixing core comprises a plurality of magnet fixing holes configured to receive the plurality of permanent magnets in a circumferential direction, and
wherein the at least one permanent magnet fixing core comprises a fixing protrusion that is provided in a side of an outer end of each of the plurality of magnet fixing holes configured to secure the permanent magnet.

3. The motor of claim 2, wherein the fixing protrusion is provided in opposite sides of the outer end of each of the plurality of magnet fixing holes.

4. The motor of claim 2, wherein a surface of the fixing protrusion opposite to a surface of the fixing protrusion being in contact with the permanent magnet matches the outer circumferential surface of the at least one permanent magnet fixing core.

5. The motor of claim 2, wherein a radius of a surface of the fixing protrusion opposite to a surface of the fixing protrusion being in contact with the permanent magnet is smaller than a radius of the at least one permanent magnet fixing core.

6. The motor of claim 2,
wherein the rotor comprises a plurality of permanent magnet fixing cores, and
wherein the plurality of permanent magnet fixing cores are stacked so that the fixing protrusion formed in each of the plurality of magnet fixing holes of two adjacent permanent magnet fixing cores is positioned opposite to each other.

7. The motor of claim 2,
wherein the rotor comprises a plurality of permanent magnet fixing cores, and
wherein the plurality of permanent magnet fixing cores are stacked so that the fixing protrusion formed in each of the plurality of magnet fixing holes of two adjacent permanent magnet fixing cores is positioned in a same side.

8. The motor of claim 1,
wherein the at least one injection fixing core comprises a plurality of magnet receiving holes configured to receive the plurality of permanent magnets in a circumferential direction, and
wherein the fixing groove is provided in a side of an outer end of each of the plurality of magnet receiving holes in a radial direction and into which a projecting portion of the injection ring is inserted.

9. The motor of claim 8, wherein the fixing groove is provided in opposite sides of the outer end of each of the plurality of magnet receiving holes.

10. The motor of claim 8, wherein the fixing groove is formed in any one shape of a circle, an ellipse, a rectangle, and a slit shape.

11. The motor of claim 8,
wherein the rotor comprises a plurality of injection fixing cores, and
wherein the plurality of injection fixing cores are stacked so that the fixing groove formed in each of the plurality of magnet receiving holes of two adjacent injection fixing cores is positioned opposite to each other.

12. The motor of claim 8,
wherein the rotor comprises a plurality of injection fixing cores, and
wherein the plurality of injection fixing cores are stacked so that the fixing groove formed in each of the plurality of magnet receiving holes of two adjacent injection fixing cores is positioned in a same side.

13. The motor of claim 1, wherein the at least one permanent magnet fixing core and the at least one injection fixing core are stacked alternately in an order of a permanent magnet fixing core, an injection fixing core stacked on a top of the permanent magnet fixing core, and another permanent magnet fixing core stacked on a top of the injection fixing core.

14. The motor of claim 13,
wherein the at least one permanent magnet fixing core comprises a plurality of magnet fixing holes configured to receive the plurality of permanent magnets in a circumferential direction, and
wherein the at least one permanent magnet fixing core comprises a fixing protrusion that is provided in a side of an outer end of each of the plurality of magnet fixing holes in a radial direction to secure the permanent magnet.

15. The motor of claim 14,
wherein the at least one injection fixing core comprises a plurality of magnet receiving holes configured to receive the plurality of permanent magnets in a circumferential direction, and
wherein the fixing groove is provided in a side of an outer end of each of the plurality of magnet receiving holes in a radial direction and into which a projecting portion of the injection ring is inserted.

16. The motor of claim 1, wherein the at least one permanent magnet fixing core and the at least one injection fixing core are stacked alternately in an order of an injection fixing core, a permanent magnet fixing core stacked on a top of the injection fixing core, and another injection fixing core stacked on a top of the permanent magnet fixing core.

17. A motor comprising:
a stator;
a rotor rotatably disposed in the stator; and
a motor shaft provided in the rotor to rotate integrally with the rotor,
wherein the rotor comprises:
a plurality of mixed fixing cores stacked alternately in a direction of the motor shaft,
a plurality of permanent magnets inserted at a predetermined interval in the plurality of mixed fixing cores, and
an injection ring formed to cover the plurality of mixed fixing cores and the plurality of permanent magnets,
wherein each of the plurality of mixed fixing cores comprises a plurality of magnet fixing holes configured to receive the plurality of permanent magnets in a circumferential direction,
wherein each of the plurality of magnet fixing holes comprises:
a fixing protrusion formed at one side of an outer end in a radial direction configured to secure a permanent magnet, and prevent the plurality of permanent magnets from becoming separated from the rotor by a centrifugal force, and
a fixing groove formed at another side of the outer end configured to secure the injection ring, and prevent the injection ring from becoming separated from the rotor by the centrifugal force, wherein the another side of the outer end does not include a protrusion for fixing the permanent magnet, and
wherein the fixing protrusion does not radially overlap the fixing groove, and
wherein the fixing groove is inclined at a certain angle with respect to a magnet receiving hole toward an inside of a core arm from an outer circumferential surface of the plurality of mixed fixing cores.

18. The motor of claim 17, wherein the plurality of mixed fixing cores are stacked so that the fixing protrusion and the fixing groove are positioned alternately in the direction of the motor shaft.

19. The motor of claim 17, wherein the plurality of mixed fixing cores are stacked so that the fixing protrusion and the fixing groove are positioned in a same side in the direction of the motor shaft.

20. A motor comprising a stator and a rotor rotatably disposed in the stator, the rotor comprising:
at least one permanent magnet fixing core;
at least one injection fixing core alternately stacked with the at least one permanent magnet fixing core in a direction of a motor shaft;
a plurality of permanent magnets inserted at a predetermined interval in the at least one permanent magnet fixing core and the at least one injection fixing core; and
an injection ring formed to cover the at least one permanent magnet fixing core, the at least one injection fixing core, and the plurality of permanent magnets,
wherein the at least one permanent magnet fixing core comprises a plurality of magnet fixing holes configured to receive the plurality of permanent magnets and a fixing protrusion formed at an outer end of each of the plurality of magnet fixing holes,
wherein the at least one injection fixing core comprises a plurality of magnet receiving holes configured to receive the plurality of permanent magnets and a fixing groove formed at an outer end of each of the plurality of magnet receiving holes,
wherein the at least one injection fixing core does not radially overlap the plurality of permanent magnets,
wherein the at least one injection fixing core comprises a fixing groove inclined at a certain angle with respect to a magnet receiving hole toward an inside of a core arm from an outer circumferential surface of the at least one injection fixing core, and
wherein the at least one injection fixing core does not include a protrusion for fixing a permanent magnet.

* * * * *